United States Patent
Shanmugam et al.

(10) Patent No.: US 10,192,206 B2
(45) Date of Patent: Jan. 29, 2019

(54) METHOD AND SYSTEM FOR INTEGRATING DISCRETE INVOICES INTO A PERSONAL FINANCIAL MANAGEMENT AND BILL PAYMENT SYSTEM AND THEN AGGREGATING DISCRETE INVOICES HAVING THE SAME PAYOR USER AND THE SAME PAYEE BUSINESS INTO A SINGLE PAYMENT DUE ITEM FOR PROCESSING

(71) Applicant: Intuit Inc., Mountain View, CA (US)

(72) Inventors: Elangovan Shanmugam, Cupertino, CA (US); Sean McCluskey, Redwood City, CA (US); Jesse Aaron Axelowitz, San Francisco, CA (US); Ashwin Singh Khurana, Fremont, CA (US); Michael J. Seilnacht, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 190 days.

(21) Appl. No.: 15/219,510

(22) Filed: Jul. 26, 2016

(65) Prior Publication Data
US 2018/0032981 A1 Feb. 1, 2018

(51) Int. Cl.
G06Q 20/14 (2012.01)
G06Q 30/04 (2012.01)

(52) U.S. Cl.
CPC .............. *G06Q 20/14* (2013.01); *G06Q 30/04* (2013.01)

(58) Field of Classification Search
CPC ................................. G06Q 20/14; G06Q 30/04
See application file for complete search history.

(56) References Cited

U.S. PATENT DOCUMENTS

| | | |
|---|---|---|
| 8,798,354 B1 | 8/2014 | Bunzel et al. |
| 8,799,157 B1 | 8/2014 | Weisman et al. |
| 9,286,332 B1 | 3/2016 | Roumeliotis et al. |
| 2002/0013850 A1 | 1/2002 | Mitchell et al. |
| 2003/0101112 A1 | 5/2003 | Gallagher et al. |
| 2003/0216990 A1 | 11/2003 | Star |
| 2004/0193542 A1 | 9/2004 | Brown et al. |
| 2004/0210520 A1 | 10/2004 | Fitzgerald et al. |
| 2005/0177448 A1 | 8/2005 | Fu et al. |
| 2008/0255971 A1 | 10/2008 | McKinnon et al. |
| 2009/0132414 A1 | 5/2009 | Philliou et al. |
| 2012/0303522 A1 | 11/2012 | May et al. |

(Continued)

FOREIGN PATENT DOCUMENTS

| | | |
|---|---|---|
| JP | 2004-259196 | 9/2004 |
| WO | WO 03/096250 | 11/2003 |
| WO | WO 2015/012991 | 1/2015 |

*Primary Examiner* — Ramsey Refai
(74) *Attorney, Agent, or Firm* — Hawley Troxell Ennis & Hawley LLP; Philip McKay

(57) ABSTRACT

Invoice related financial transaction data is obtained and integrated into a personal financial management and bill payment system. All invoices represented in the invoice related financial transaction data having the same payor user of the personal financial management and bill payment system and the same payee business are then identified and collected into aggregated same payor/same payee invoice related financial transaction data. The aggregated same payor/same payee invoice related financial transaction data is then analyzed to determine the aggregated total amount owed to the payee business by the payor user and this aggregated total amount is processed as a single payment due item by the personal financial management and bill payment system.

30 Claims, 2 Drawing Sheets

(56) References Cited

U.S. PATENT DOCUMENTS

| | | |
|---|---|---|
| 2013/0204756 A1 | 8/2013 | Orttung et al. |
| 2014/0025564 A1 | 1/2014 | Evans |
| 2014/0129431 A1 | 5/2014 | Orttung et al. |
| 2014/0222669 A1 | 8/2014 | Novak et al. |
| 2014/0372169 A1 | 12/2014 | Kim et al. |

METHOD AND SYSTEM FOR INTEGRATING DISCRETE INVOICES INTO A PERSONAL FINANCIAL MANAGEMENT AND BILL PAYMENT SYSTEM AND THEN AGGREGATING DISCRETE INVOICES HAVING THE SAME PAYOR USER AND THE SAME PAYEE BUSINESS INTO A SINGLE PAYMENT DUE ITEM FOR PROCESSING

RELATED APPLICATIONS/INCORPORATION BY REFERENCE

This application is related to U.S. patent application Ser. No. 15/140,117, filed on behalf of the same Inventors of the present patent application, filed on Apr. 27, 2016, entitled "METHOD AND SYSTEM FOR PROVIDING INVOICES GENERATED THROUGH A BUSINESS INVOICING SYSTEM TO A CUSTOMER USER OF A PERSONAL FINANCIAL MANAGEMENT AND BILL PAYMENT SYSTEM," which is herein incorporated by reference in its entirety as if it were fully set forth herein.

This application is also related to U.S. patent application Ser. No. 15/140,131, filed on behalf of the same Inventors of the present patent application, filed on Apr. 27, 2016, entitled "METHOD AND SYSTEM FOR IDENTIFYING INVOICES THAT ARE PAID THROUGH A PERSONAL FINANCIAL MANAGEMENT AND BILL PAYMENT SYSTEM," which is herein incorporated by reference in its entirety as if it were fully set forth herein.\

This application is also related to U.S. patent application Ser. No. 15/142,708, filed on behalf of the same Inventors of the present patent application, filed on Apr. 29, 2016, entitled "METHOD AND SYSTEM FOR INTEGRATING BUSINESS INVOICES INTO A PERSONAL FINANCIAL MANAGEMENT AND BILL PAYMENT SYSTEM," which is herein incorporated by reference in its entirety as if it were fully set forth herein.

BACKGROUND

Currently, several personal financial management and bill payment systems are available to help a personal financial management and bill payment system user, or any authorized party acting on behalf of a personal financial management and bill payment system user, obtain financial transaction data representing financial transactions conducted by the user, process/analyze the financial transaction data, display categorized financial transaction data, generate financial transaction reports, generate bills due and payment due reports, and/or make manual, semi-automated, and/or automatic bill payments through the personal financial management and bill payment system.

Some personal financial management and bill payment systems help users manage their finances and/or track their expenditures/financial transactions by providing a centralized interface with banks, credit card companies, and various other financial institutions, for electronically identifying and categorizing the user's financial transaction data. Currently, personal financial management and bill payment systems typically obtain electronic financial transaction data, such as payee data, payment amount data, transaction date data, etc. via communication with banks, credit card providers, or other financial institutions, using electronic data transfer systems, or various other systems for obtaining/transferring financial transaction data.

Personal financial management and bill payment systems have proven to be very popular and valuable tools for the users of the personal financial management and bill payment systems. This is largely due to the fact that using a personal financial management and bill payment system, a user can obtain most, if not all, of their financial transaction data from multiple sources and this data can be processed and analyzed in its entirety to create in depth, and very complete reports and features. Some personal financial management and bill payment systems include a payment due report/display generation feature. Typically, a payment due report includes personal financial management and bill payment system payment due data representing a listing of payments due, e.g., bill payment due items, within a defined period of time, such as a month, which require the user's attention.

In some cases, the user of the personal financial management and bill payment system is also provided the capability to make the listed payments on a manual, semi-automatic, i.e., with user approval, or automatic, basis. Users of personal financial management and bill payment systems have come to rely on these payment due reports and often use the reports, and payment features, to pay the vast majority of their bills through the personal financial management and bill payment system. However, there remain several issues that are associated with currently available personal financial management and bill payment systems.

First, currently available personal financial management and bill payment systems do not provide a mechanism for automatically identifying, or distinguishing, invoices, invoice related financial transaction data, and/or invoice payments from bill payment data and then properly processing and integrating identified invoice related financial transaction data into the personal financial management and bill payment system as payment due items.

As used herein, the term "bill" includes, but is not limited to, an account statement or other potentially recurring cost and financial transaction. Currently, bill payments due are represented in personal financial management and bill payment system payment due data. Examples of bills include, but are not limited to: rent payments, utility payments, credit card payments, grocery store payments, vehicle costs, etc. bills are typically associated with larger, well known, and/or nationally or regionally known, payee businesses.

In contrast to the term "bill", herein the term "invoice" includes, but is not limited to, documents/data associated with a specific product and/or service provided by a business and for which full payment is typically requested via a discrete invoice statement. Herein the term "invoice related financial transaction data" includes data representing all, or part of, an "invoice." A given discrete invoice is therefore typically a non-recurring expense and/or is associated with specific products and/or services rendered, even though multiple, and even recurring identical, invoices can be generated by the same business for the same customer if multiple products and/or services, and/or the same products and/or services, are provided. Invoices are typically associated with smaller, regional or local, payee businesses than payee businesses associated with bills.

Herein the terms "payment," and/or "payment due," and/or "payment due items" are used interchangeably and include any payment owed by a first party, i.e., payor party, to a second party, i.e., a payee party. Consequently, as used herein, the terms "payment" and/or "payment due" include both "bills" and "invoices."

One side effect of the popularity of payment due reports and the bill payment features offered through some personal financial management and bill payment systems is that any payment due items not included in the payment due reports, and/or not capable of being paid through the bill payment feature of the personal financial management and bill payment systems, are often forgotten, or at least treated as secondary, by the users of the personal financial management and bill payment systems. In short, as users of personal financial management and bill payment systems come to rely on the payment due reports listing payment due items and the bill payment features offered through some personal financial management and bill payment systems, they may forget, or neglect, any payments, such as invoice payments, that are not included in the payment due reports and payment due item listings and/or can't be paid through a bill payment feature of currently available personal financial management and bill payment systems.

This represents a significant and long standing technical problem in the financial management system, payment processing, and invoicing arts. This is because currently available personal financial management and bill payment systems process financial transaction data and generate personal financial management and bill payment system payment due data largely associated with recurring payments and/or revolving accounts, i.e., bills, such as credit card accounts, that can be identified through analysis of the users' financial transaction data history. In particular, currently available personal financial management and bill payment systems only identify recurring bills for inclusion in personal financial management and bill payment system payment due data and the payment due item listings of payment due reports, and/or other reminders of payments due, that are ultimately provided to the users of the personal financial management and bill payment systems. As a result, currently, one time only payments due, or non-revolving accounts, such as invoices, are almost never identified or included in the personal financial management and bill payment system payment due data and/or payment due item listings of payment due reports generated by personal financial management and bill payment systems.

As a result of the situation described above, smaller, local or regional, businesses generating invoices for their customers must currently rely on delivering their invoices to the customers through secondary, i.e., non-personal financial management and bill payment systems, mechanisms and/or processes such as e-mail or postal service. This, in turn, often leads to a situation where the invoicing business has trouble getting invoices in front of their customers, and/or getting their customers' attention, and/or integrating their invoices into the customers' payment routine, and/or getting paid. This situation exists today despite the fact that most businesses are business users of sophisticated business invoicing systems and/or business financial management systems that include business invoicing features.

Consequently, there is a long standing technical problem in the financial management system, payment processing, and invoicing arts in that businesses are currently unable to access personal financial management and bill payment systems used by their customers and provide invoices to their customers through the personal financial management and bill payment systems used by their customers as payment due items.

In addition, currently, users of bill payment features offered through a personal financial management and bill payment system can pay both bills and invoices, that is when the invoice related financial transaction data is entered, typically manually, by simply entering payee data, amount data, routing data, and payment date data, and, importantly, without indicating if a given payment is a payment associated with a bill or with an invoice. In addition, financial transaction data obtained by, or through, a personal financial management and bill payment system often includes financial transaction data representing financial transactions performed by, or on behalf, of a user through another entity such as another financial institution account. Often, this financial transaction data also fails to indicate whether a given payment is associated with a bill or with an invoice.

Consequently, users of personal financial management and bill payment systems can pay either bills or invoices without designating which type of payment is being made. This is unfortunate given the differences between "bills" and "invoices" in terms of how these two types of payments should ideally be identified, categorized, and processed by the personal financial management and bill payment system. In short, it would be very beneficial to identify any invoices and, once identified, provide a feature whereby identified invoices generated by a business invoicing system, and/or one or more financial institutions providing financial transaction data to the personal financial management and bill payment system, could be identified and then properly processed and integrated into the personal financial management and bill payment system as a payment due item.

As a result there is also a long standing technical problem in the financial management system, payment processing, and invoicing arts in that currently available personal financial management and bill payment systems do not provide a mechanism for automatically identifying, or distinguishing, invoices, invoice data, and/or invoice payments and then properly processing and integrating identified invoices into a personal financial management and bill payment system as a payment due item.

Another issue associated with currently available personal financial management and bill payment systems is that each time a discrete payment is made, or funds are otherwise transferred, through a personal financial management and bill payment system, a fee is typically charged by a financial institution providing the funds for the bill payment or funds transfer and/or the provider of the personal financial management and bill payment system. Consequently, it is highly desirable that a user of the personal financial management and bill payment system minimize the number of discrete payments made through the personal financial management and bill payment system.

However, since businesses are currently unable to access personal financial management and bill payment systems used by their customers and provide invoices to their customers through the personal financial management and bill payment systems used by their customers as payment due items, and currently available personal financial management and bill payment systems do not provide a mechanism for automatically identifying, or distinguishing, invoices, invoice related financial transaction data, and/or invoice payments or properly processing and integrating identified invoices into a personal financial management and bill payment system as a payment due item, invoices are either paid individually by mechanisms outside the personal financial management and bill payment system or, even if the invoice related financial transaction data is manually entered, or otherwise provided, to the personal financial management and bill payment system, or otherwise obtained, each discrete invoice is presented as a discrete payment due, and is paid individually, even when multiple invoices are directed to the same payor user by the same payee business. Consequently, currently, a user is typically charged for each discrete invoice paid even if each payment is made to the same payee business.

What is needed is a method and system for automatically integrating invoice related financial transaction data into a personal financial management and bill payment system and/or identifying, or distinguishing, invoice related financial transaction data, and then aggregating invoices represented in the invoice related financial transaction data having the same payor user and the same payee business into single payment due item. In this way, invoices represented in invoice related financial transaction data could be processed by the personal financial management and bill payment system at minimal cost to the user of the personal financial management and bill payment system, and in a seamless and effective manner.

SUMMARY

In accordance with one embodiment, invoice related financial transaction data is obtained and integrated into a personal financial management and bill payment system. Then, all invoices represented in the invoice related financial transaction data having the same payor user of the personal financial management and bill payment system and the same payee business are identified and collected into aggregated same payor/same payee invoice related financial transaction data. In one embodiment, the aggregated same payor/same payee invoice related financial transaction data is then analyzed to determine the aggregated total amount owed to the payee business by the payor user and this aggregated total amount is processed as a single payment due item by the personal financial management and bill payment system.

Consequently, using the disclosed embodiments, invoices represented in invoice related financial transaction data can be integrated and processed by the personal financial management and bill payment system at minimal cost to the user of the personal financial management and bill payment system, and in a seamless and effective manner.

Therefore, the disclosed embodiments provide an efficient, effective, and highly adaptable solution to the long standing technical problem in the bill payment, invoice processing, and financial management arts of automatically integrating invoice related financial transaction data into a personal financial management and bill payment system and/or identifying, or distinguishing, invoice related financial transaction data, and then aggregating invoices represented in the invoice related financial transaction data having the same payor user and the same payee business into single payment due item.

In accordance with one embodiment of a method for integrating discrete invoices into a personal financial management and bill payment system and then aggregating discrete invoices having the same payor user and the same payee business into a single payment due item for processing, access to invoice related financial transaction data generated by the one or more payee businesses is obtained.

In one embodiment, the invoice related financial transaction data represents two or more discrete invoices submitted by one or more payee businesses requesting payment by one or more payor users of the personal financial management and bill payment system. In one embodiment, the invoice related financial transaction data includes payee business identity data associated with each discrete invoice represented in the invoice related financial transaction data. In one embodiment, the payee business identity data represents the identity of the payee business associated with each discrete invoice represented in the invoice related financial transaction data.

In one embodiment, the invoice related financial transaction data also includes payor user identity data associated with each discrete invoice represented in the invoice related financial transaction data. In one embodiment, the payor user identity data represents the identity of the payor user associated with each discrete invoice represented in the invoice related financial transaction data.

In one embodiment, the invoice related financial transaction data further includes invoice amount data associated with each discrete invoice represented in the invoice related financial transaction data. In one embodiment, the invoice amount data represents the payment amount associated with each discrete invoice represented in the invoice related financial transaction data.

In accordance with one embodiment, the invoice related financial transaction data is integrated into personal financial management and bill payment system payment due data associated with a personal financial management and bill payment system. In one embodiment, the personal financial management and bill payment system payment due data represents one or more payments due associated with one or more users of the personal financial management and bill payment system as payment due items to be paid through the personal financial management and bill payment system.

In accordance with one embodiment, access to the personal financial management and bill payment system and the personal financial management and bill payment system payment due data, including the integrated invoice related financial transaction data, is obtained and the personal financial management and bill payment system payment due data, including the integrated invoice related financial transaction data, is analyzed to identify first payor user personal financial management and bill payment system payment due data associated with a first payor user of the personal financial management and bill payment system.

In accordance with one embodiment, the first payor user personal financial management and bill payment system payment due data is analyzed to identify first payor user invoice related financial transaction data. In one embodiment, the first payor user invoice related financial transaction data represents two or more discrete invoices submitted by one or more payee businesses requesting payment from the first payor user.

In accordance with one embodiment, the first payor user invoice related financial transaction data is analyzed to identify the payee business identity data associated with each discrete invoice represented in the first payor user invoice related financial transaction data and a first payee business represented in the payee business identity data associated with two or more discrete invoices represented in the first payor user invoice related financial transaction data is identified.

In accordance with one embodiment, all the first payor user invoice related financial transaction data representing the two or more discrete invoices that include payee business identity data identifying the first payee business is aggregated to generate aggregated first payor user/first payee business invoice related financial transaction data and the aggregated first payor user/first payee business invoice related financial transaction data is analyzed to identify the invoice amount data associated with each of the two or more discrete invoices represented in the aggregated first payor user/first payee business invoice related financial transaction data.

In accordance with one embodiment, the invoice amount data associated with each of the two or more discrete invoices represented in the aggregated first payor user/first payee business invoice related financial transaction data is then summed to generate aggregated total first payor user/first payee business invoice related financial transaction amount data representing a total amount owed to the first payee business by the first payor user of the personal financial management and bill payment system.

In accordance with one embodiment, the aggregated first payor user/first payee business invoice related financial transaction data is then processed as a single first payor user payment due item using the personal financial management and bill payment system.

The embodiments disclosed herein provide an efficient, effective, and highly adaptable solution to the long standing technical problem in the bill payment, invoice processing, and financial management arts of automatically integrating invoice related financial transaction data into a personal financial management and bill payment system and/or identifying, or distinguishing, invoice related financial transaction data, and then aggregating invoices represented in the invoice related financial transaction data having the same payor user and the same payee business into single payment due item.

However, the disclosed method and system for integrating discrete invoices into a personal financial management and bill payment system and then aggregating discrete invoices having the same payor user and the same payee business into a single payment due item for processing does not encompass, embody, or preclude other forms of innovation in the area of automated financial transaction bill payment processing and invoicing. In addition, the disclosed method and system for integrating discrete invoices into a personal financial management and bill payment system and then aggregating discrete invoices having the same payor user and the same payee business into a single payment due item for processing is not related to any fundamental economic practice, fundamental data processing practice, mental steps, or pen and paper based solution. In fact, the disclosed embodiments are directed to providing solutions to the relatively new problems associated with the automatic processing and display of electronic financial transaction data obtained from multiple sources, making electronic bill payments, and the management and processing of large amounts of data, i.e., "big data." Consequently, the disclosed method and system for integrating discrete invoices into a personal financial management and bill payment system and then aggregating discrete invoices having the same payor user and the same payee business into a single payment due item for processing is not directed to, does not encompass, and is not merely, an abstract idea or concept.

In addition, the disclosed method and system for integrating discrete invoices into a personal financial management and bill payment system and then aggregating discrete invoices having the same payor user and the same payee business into a single payment due item for processing provides for significant improvements to the technical fields of electronic transaction data processing, invoicing, financial transaction categorization, information dissemination, data processing, data management, data filtering and mining, automatic electronic bill payment, and user experience.

In addition, by allowing for the integration of invoices and invoice data into a personal financial management and bill payment system, the disclosed method and system for integrating discrete invoices into a personal financial management and bill payment system and then aggregating discrete invoices having the same payor user and the same payee business into a single payment due item for processing helps users of the personal financial management and bill payment system identify and pay their invoices. This, in turn, helps avoid the reissuance and repeated transmission of payment due reminders and for the entry, processing, and dissemination, of redundant invoice data; thereby eliminating unnecessary data analysis before resources are allocated to processing, and/or correcting, redundant reminder data and the redundant reminder data is further transmitted/distributed.

Consequently, using the disclosed method and system for integrating discrete invoices into a personal financial management and bill payment system and then aggregating discrete invoices having the same payor user and the same payee business into a single payment due item for processing results in more efficient use of human and non-human resources, fewer processor cycles being utilized, reduced memory utilization, and less communications bandwidth being utilized to relay data to, and from, backend systems and client systems.

As a result, computing systems are transformed into faster, more efficient, and more effective computing systems by implementing the method and system for integrating discrete invoices into a personal financial management and bill payment system and then aggregating discrete invoices having the same payor user and the same payee business into a single payment due item for processing.

In addition, the disclosed method and system for integrating discrete invoices into a personal financial management and bill payment system and then aggregating discrete invoices having the same payor user and the same payee business into a single payment due item for processing provides for the entry, processing, and dissemination, of only relevant portions of data; thereby eliminating unnecessary data analysis and correction before resources are allocated to processing, and/or correcting, faulty/irrelevant data, and/or the faulty/irrelevant data is further transmitted/distributed.

In addition, by aggregating invoices represented in the invoice related financial transaction data having the same payor user and the same payee business into single payment due item, the disclosed method and system for integrating discrete invoices into a personal financial management and bill payment system and then aggregating discrete invoices having the same payor user and the same payee business into a single payment due item for processing provides for the processing and dissemination of invoice related financial transaction data representing multiple discrete invoices as a single payment due entity/object. This, in turn, helps avoid the processing and transmission of multiple individual invoice payment related data sets.

Consequently, using the disclosed method and system for integrating discrete invoices into a personal financial management and bill payment system and then aggregating discrete invoices having the same payor user and the same payee business into a single payment due item for processing results in more efficient use of human and non-human resources, fewer processor cycles being utilized, reduced memory utilization, and less communications bandwidth being utilized to relay data to, and from, backend systems and client systems.

As a result, computing systems are transformed into faster, more efficient, and more effective computing systems by implementing the method and system for integrating discrete invoices into a personal financial management and bill payment system and then aggregating discrete invoices having the same payor user and the same payee business into a single payment due item for processing.

Figure 1:
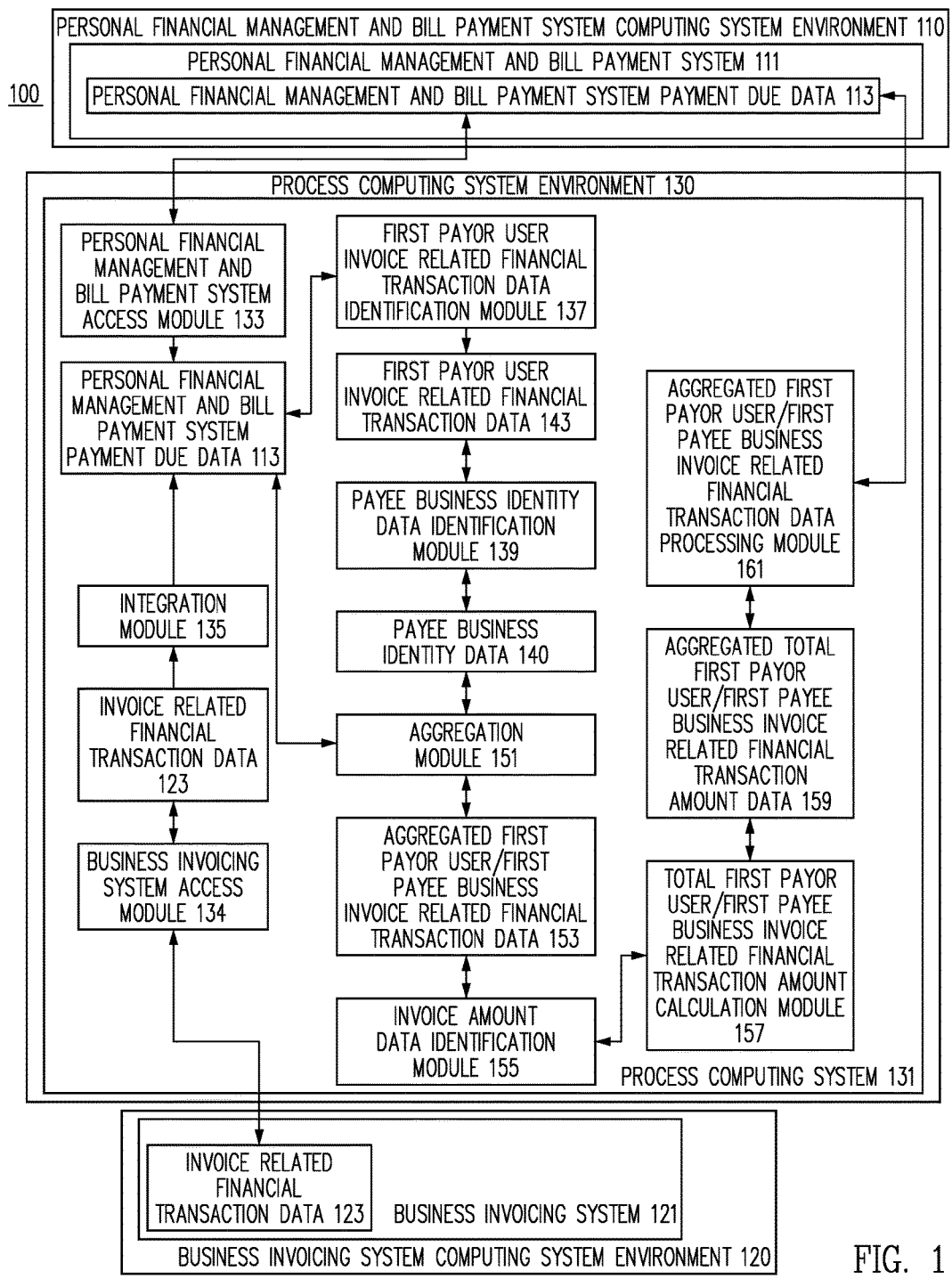
FIG. 1 is a high level functionality-based block diagram of a hardware and production environment for integrating discrete invoices into a personal financial management and bill payment system and then aggregating discrete invoices having the same payor user and the same payee business into a single payment due item for processing, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

TERM DEFINITIONS

Herein, the term "personal financial management and bill payment system" includes, but is not limited to, the following: computing system, desktop system, mobile system, and/or wearable device implemented, and/or online, and/or web-based, storage based, persistence based, personal financial transaction aggregation and/or processing systems, services, packages, programs, modules, or applications; computing system, desktop system, mobile system, and/or wearable device implemented, and/or online, and/or web-based, storage based, persistence based, personal financial management and budgeting systems, services, packages, programs, modules, or applications; computing system, desktop system, mobile system, and/or wearable device implemented, and/or online, and/or web-based, storage based, persistence based, personal data management systems, services, packages, programs, modules, or applications; computing system, desktop system, mobile system, and/or wearable device implemented, and/or online, and/or web-based, storage based, persistence based, personal accounting systems, services, packages, programs, modules, or applications; personal electronic tax preparation systems, services, packages, programs, modules, or applications; and various other personal electronic data management systems, services, packages, programs, modules, or applications, whether known at the time of filling, or as developed later.

Specific examples of personal financial management and bill payment systems include, but are not limited to the following: Mint™, available from Intuit, Inc. of Mountain View, Calif.; Mint Online™, available from Intuit, Inc. of Mountain View, Calif.; TurboTax™ available from Intuit, Inc. of Mountain View, Calif.; TurboTax Online™ available from Intuit, Inc. of Mountain View, Calif.; and/or various other software systems discussed herein, and/or known to those of skill in the art at the time of filing, and/or as developed after the time of filing.

Herein, the term "business invoicing system" includes, but is not limited to, any system through which a business can generate, and/or submit, and/or process invoices requesting payment for products and/or services provided by the business to customers of the business. Therefore, the term "business invoicing system" includes, but is not limited to, the following: computing system, desktop system, mobile system, and/or wearable device implemented, and/or online, and/or web-based, storage based, persistence based, business accounting and/or invoicing systems, services, packages, programs, modules, or applications; computing system, desktop system, mobile system, and/or wearable device implemented, and/or online, and/or web-based, storage based, persistence based, business financial transaction aggregation and/or processing systems, services, packages, programs, modules, or applications; computing system, desktop system, mobile system, and/or wearable device implemented, and/or online, and/or web-based, storage based, persistence based, business financial management and budgeting systems, services, packages, programs, modules, or applications; computing system, desktop system, mobile system, and/or wearable device implemented, and/or online, and/or web-based, storage based, persistence based, business management systems, services, packages, programs, modules, or applications; business electronic tax preparation systems, services, packages, programs, modules, or applications; and various other business electronic data management systems, services, packages, programs, modules, or applications, whether known at the time of filling, or as developed later.

Specific examples of "business invoicing systems" include, but are not limited to, the following: QuickBooks™, available from Intuit, Inc. of Mountain View, Calif.; QuickBooks Online™, available from Intuit, Inc. of Mountain View, Calif.; QuickBooks Self-Employed™, available from Intuit, Inc. of Mountain View, Calif.; TurboTax™ available from Intuit, Inc. of Mountain View, Calif.; TurboTax Online™ available from Intuit, Inc. of Mountain View, Calif.; and/or various other software systems discussed herein, and/or known to those of skill in the art at the time of filing, and/or as developed after the time of filing.

Herein, the terms "software system" and "software application" are used interchangeably and can be, but are not limited to, any data management system implemented on a computing system, accessed through one or more servers, accessed through a network, accessed through a cloud, and/or provided through any system or by any mechanism and/or process, as discussed herein, and/or as known in the art at the time of filing, and/or as developed after the time of filing, that gathers/obtains data, from one or more sources and/or has the capability to analyze at least part of the data.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

Herein, the term "party," "user," "user consumer," and "customer" are used interchangeably to denote any party and/or entity that interfaces with, and/or to whom information is provided by, the method and system for integrating discrete invoices into a personal financial management and bill payment system and then aggregating discrete invoices having the same payor user and the same payee business into a single payment due item for processing described herein, and/or a person and/or entity that interfaces with, and/or to whom information is provided by, the method and system for integrating discrete invoices into a personal financial management and bill payment system and then aggregating discrete invoices having the same payor user and the same payee business into a single payment due item for processing described herein, and/or a legal guardian of person and/or entity that interfaces with, and/or to whom information is provided by, the method and system for integrating discrete invoices into a personal financial management and bill payment system and then aggregating discrete invoices having the same payor user and the same payee business into a single payment due item for processing described herein, and/or an authorized agent of any party and/or person and/or entity that interfaces with, and/or to whom information is provided by, the method and system for integrating discrete invoices into a personal financial management and bill payment system and then aggregating discrete invoices having the same payor user and the same payee business into a single payment due item for processing described herein. For instance, in various embodiments, a user can be, but is not limited to, a person, a commercial entity, an application, a service, and/or a computing system.

Herein, the term "financial transaction" includes, but is not limited to, any interaction between two or more parties involving the transfer, or re-categorization, of funds between the parties. Herein, the term "financial transaction data" includes, but is not limited to, electronic data representing at least one financial transaction and that is capable of being processed by a processor, and/or stored in a memory, and/or is otherwise machine readable.

Herein, the term "product and/or service provider" includes any party and/or entity that is associated with a user through a financial transaction represented by financial transaction data.

As used herein, the term "bill" includes, but is not limited to, an account statement or other potentially recurring cost and financial transaction. Currently, bill payments due are represented in personal financial management and bill payment system payment due data. Examples of bills include, but are not limited to: rent payments, utility payments, credit card payments, grocery store payments, vehicle costs, etc. bills are typically associated with larger, well known, and/or nationally or regionally known, payee businesses.

In contrast to the term "bill", herein the term "invoice" includes, but is not limited to, documents/data associated with a specific product and/or service provided by a business and for which full payment is typically requested via a discrete invoice statement. Herein the term "invoice related financial transaction data" includes data representing all, or part of, an "invoice." A given discrete invoice is therefore typically a non-recurring expense and/or is associated with specific products and/or services rendered, even though multiple, and even recurring identical, invoices can be generated by the same business for the same customer if multiple products and/or services, and/or the same products and/or services, are provided. Invoices are typically associated with smaller, regional or local, payee businesses than payee businesses associated with bills.

Herein the terms "payment," and/or "payment due," and/or "payment due items" are used interchangeably and include any payment owed by a first party, i.e., payor party, to a second party, i.e., a payee party. Consequently, as used herein, the terms "payment" and/or "payment due" include both "bills" and "invoices."

As used herein, the term "payor user" includes any user of a personal financial management and bill payment system associated with an invoice included in invoice related financial transaction data and to whom the invoice related financial transaction data is directed by a payee business.

As used herein, the term "payee business" includes any party or entity associated with an invoice included in invoice related financial transaction data and to whom the invoice amount associated with in invoice represented in invoice related financial transaction data is owed by a payor user.

DETAILED DISCLOSURE

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment of a method for integrating discrete invoices into a personal financial management and bill payment system and then aggregating discrete invoices having the same payor user and the same payee business into a single payment due item for processing, access to invoice related financial transaction data generated by the one or more payee businesses is obtained.

In one embodiment, the obtained invoice related financial transaction data represents two or more discrete invoices submitted by one or more payee businesses requesting payment by one or more payor users of the personal financial management and bill payment system.

In one embodiment, the invoice related financial transaction data includes payee business identity data associated with each discrete invoice represented in the invoice related financial transaction data. In one embodiment, the payee business identity data represents the identity of the payee business associated with each discrete invoice represented in the invoice related financial transaction data.

In one embodiment, the invoice related financial transaction data also includes payor user identity data associated with each discrete invoice represented in the invoice related financial transaction data. In one embodiment, the payor user identity data represents the identity of the payor user associated with each discrete invoice represented in the invoice related financial transaction data.

In one embodiment, the invoice related financial transaction data further includes invoice amount data associated with each discrete invoice represented in the invoice related financial transaction data. In one embodiment, the invoice amount data represents the payment amount associated with each discrete invoice represented in the invoice related financial transaction data.

In accordance with one embodiment, the invoice related financial transaction data generated by the one or more payee businesses is obtained from a business invoicing system provided to business users of the business invoicing system.

As noted above, herein, the term "business invoicing system" includes, but is not limited to, any system through which a business can generate, and/or submit, and/or process invoices requesting payment for products and/or services provided by the business to customers of the business. Therefore, the term "business invoicing system" includes, but is not limited to, the following: computing system, desktop system, mobile system, and/or wearable device implemented, and/or online, and/or web-based, storage based, persistence based, business accounting and/or invoicing systems, services, packages, programs, modules, or applications; computing system, desktop system, mobile system, and/or wearable device implemented, and/or online, and/or web-based, storage based, persistence based, business financial transaction aggregation and/or processing systems, services, packages, programs, modules, or applications; computing system, desktop system, mobile system, and/or wearable device implemented, and/or online, and/or web-based, storage based, persistence based, business financial management and budgeting systems, services, packages, programs, modules, or applications; computing system, desktop system, mobile system, and/or wearable device implemented, and/or online, and/or web-based, storage based, persistence based, business management systems, services, packages, programs, modules, or applications; business electronic tax preparation systems, services, packages, programs, modules, or applications; and various other business electronic data management systems, services, packages, programs, modules, or applications, whether known at the time of filing, or as developed later.

Specific examples of "business invoicing systems" include, but are not limited to, the following: QuickBooks™, available from Intuit, Inc. of Mountain View, Calif.; QuickBooks Online™, available from Intuit, Inc. of Mountain View, Calif.; QuickBooks Self-Employed™, available from Intuit, Inc. of Mountain View, Calif.; TurboTax™ available from Intuit, Inc. of Mountain View, Calif.; TurboTax Online™ available from Intuit, Inc. of Mountain View, Calif.; and/or various other software systems discussed herein, and/or known to those of skill in the art at the time of filing, and/or as developed after the time of filing.

In some embodiments, the business invoicing system is part of, and/or a feature of, a parent small business financial management system.

In one embodiment, a personal financial management and bill payment system is provided using one or more computing systems.

As noted above, herein, the term "personal financial management and bill payment system" includes, but is not limited to, the following: computing system, desktop system, mobile system, and/or wearable device implemented, and/or online, and/or web-based, storage based, persistence based, personal financial transaction aggregation and/or processing systems, services, packages, programs, modules, or applications; computing system, desktop system, mobile system, and/or wearable device implemented, and/or online, and/or web-based, storage based, persistence based, personal financial management and budgeting systems, services, packages, programs, modules, or applications; computing system, desktop system, mobile system, and/or wearable device implemented, and/or online, and/or web-based, storage based, persistence based, personal data management systems, services, packages, programs, modules, or applications; computing system, desktop system, mobile system, and/or wearable device implemented, and/or online, and/or web-based, storage based, persistence based, personal accounting systems, services, packages, programs, modules, or applications; personal electronic tax preparation systems, services, packages, programs, modules, or applications; and various other personal electronic data management systems, services, packages, programs, modules, or applications, whether known at the time of filing, or as developed later.

As noted above, specific examples of personal financial management and bill payment systems include, but are not limited to the following: Mint™, available from Intuit, Inc. of Mountain View, Calif.; Mint Online™, available from Intuit, Inc. of Mountain View, Calif.; TurboTax™ available from Intuit, Inc. of Mountain View, Calif.; TurboTax Online™ available from Intuit, Inc. of Mountain View, Calif.; and/or various other software systems discussed herein, and/or known to those of skill in the art at the time of filing, and/or as developed after the time of filing.

Currently, personal financial management and bill payment systems and business invoicing systems are typically distinct software systems operated and/or used by two distinct parties, e.g., a customer of a business and an owner of a business, respectively. Therefore, currently, personal financial management and bill payment systems and business invoicing systems typically operate in isolation from each other, even when they are offered by the same personal financial management and bill payment system and business invoicing system provider.

As a specific illustrative example, in one embodiment, the personal financial management and bill payment system used by a customer of a business, or other user, could be a personal financial transaction management system such as Mint™, available from Intuit, Inc. of Mountain View, Calif. In this specific illustrative example, a business invoicing system, used by a business user, could be a business invoicing system such as QuickBooks™, available from Intuit, Inc. of Mountain View, Calif. As seen in this specific illustrative example, both the personal financial management and bill payment system and the business invoicing system are offered by the same software system provider, i.e., in this specific case, Intuit, Inc. of Mountain View, Calif. Consequently, according to one embodiment, in this specific illustrative example, the personal financial management and bill payment system and the business invoicing system are provided the opportunity to cross pollinate and cross confirm supported data. This approach has several unique advantages.

In accordance with one embodiment, one or more processors associated with one or more computing systems are utilized to obtain access to the business invoicing system and obtain invoice related financial transaction data generated by the one or more payee businesses.

In accordance with one embodiment, obtaining access to invoice related financial transaction data generated by the one or more payee businesses includes, but is not limited to:
   a. obtaining access to personal financial management and bill payment system user financial transaction data associated with the personal financial management and bill payment system, the personal financial management and bill payment system user financial transaction data representing financial transactions associated with users of a personal financial management and bill payment system;
   b. analyzing the personal financial management and bill payment system user financial transaction data associated with the first payor user to identify payee data included in the financial transaction data associated with the first payor user, the payee data representing one or more payees associated with first payor user financial transactions associated with the first payor user represented by a portion of the personal financial management and bill payment system user financial transaction data associated with the first payor user;
   c. obtaining access to business invoicing system business user identification data associated with a business invoicing system, the business user identification data representing business users of the business invoicing system;
   d. accessing the payee data and the business user identification data and analyzing the payee data and business user identification data to determine if a payee represented in the payee data matches a business user of the business invoicing system represented in the business user identification data;
   e. identifying a payee represented in the payee data that matches a business user of the business invoicing system represented in the business user identification data, the payee being a payee associated with first financial transaction data representing a first financial transaction included in the personal financial management and bill payment system user financial transaction data associated with the first payor user;
   f. designating the payee represented in the payee data that matches the business user of the business invoicing system as a first payee business;
   g. transforming status data associated with the first financial transaction data representing the first financial transaction to first invoice related financial transaction data;
   h. processing the first invoice related financial transaction data as invoice related financial transaction data; and
   i. providing the first payee business the capability to provide invoicing data representing invoices generated by first payee business to the first payor user of the personal financial management and bill payment system through the personal financial management and bill payment system.

In accordance with one embodiment, obtaining access to invoice related financial transaction data generated by the one or more payee businesses includes, but is not limited to:
   a. obtaining access to personal financial management and bill payment system user identification data associated with users of a personal financial management and bill payment system;
   b. obtaining access to invoicing data generated through a business invoicing system, the invoicing data representing invoices sent from payee business users of the business invoicing system to payor customers of the payee business users of the business invoicing system;
   c. monitoring the invoicing data and identifying first invoice data representing an invoice generated by a first payee business user of the business invoicing system associated with a first payor customer of the first payee business user of the business invoicing system;
   d. analyzing the first invoice data to identify first payor customer identification data associated with the first payor customer of the first payee business user of the business invoicing system;
   e. analyzing the personal financial management and bill payment system user identification data and the first payor customer identification data to determine if the first payor customer associated with the first payor customer identification data is a first payor user of the personal financial management and bill payment system;
   f. if a determination is made that the first payor customer associated with the first payor customer identification data is a first payor user of the personal financial management and bill payment system, designating the first payor customer as a first payor user of the personal financial management and bill payment system; and
   g. providing the first payee business user of the business invoicing system the capability to provide invoicing data representing invoices generated by the first payee business user of the business invoicing system to the first payor user of the personal financial management and bill payment system through the personal financial management and bill payment system.

In accordance with one embodiment, obtaining access to invoice related financial transaction data generated by the one or more payee businesses includes, but is not limited to:
   a. obtaining access to personal financial management and bill payment system user identification data associated with users of a personal financial management and bill payment system;
   b. obtaining access to business invoicing system payor customer identification data generated through a business invoicing system, the business invoicing system payor customer identification data being associated with payor customers of user payee businesses of a business invoicing system;
   c. analyzing the personal financial management and bill payment system user identification data and the business invoicing system payor customer identification data to identify payor users of the personal financial management and bill payment system that are payor customers of business users of the business invoicing system;
   d. identifying a payor user of the personal financial management and bill payment system that is a payor customer of a payee business user of the business invoicing system;
   e. designating the payor user of the personal financial management and bill payment system a first payor user of the personal financial management and bill payment system;
   f. providing the first payor user of the personal financial management and bill payment system the opportunity to integrate invoices generated by the first payee business user of the business invoicing system into the personal financial management and bill payment system; and
   g. if the first payor user of the personal financial management and bill payment system agrees to integrate invoices generated by the first payee business user of the business invoicing system into the personal financial management and bill payment system, providing the first payee business user of the business invoicing system the capability to provide invoice data representing invoices generated by the first payee business user of the business invoicing system to the first payor user of the personal financial management and bill payment system through the personal financial management and bill payment system.

In accordance with one embodiment, obtaining access to invoice related financial transaction data generated by the one or more payee businesses includes any method, system, process and/or procedure for obtaining access to invoice related financial transaction data generated by the one or more payee businesses as discussed herein, known in the art at the time of filing, and/or as developed/made available after the time of filing.

In accordance with one embodiment, obtaining access to invoice related financial transaction data generated by the one or more payee businesses includes any method, system, process and/or procedure for obtaining access to invoice related financial transaction data generated by the one or more payee businesses as discussed in: U.S. patent application Ser. No. 15/140,117, filed on behalf of the same Inventors of the present patent application, filed on Apr. 27, 2016, entitled "METHOD AND SYSTEM FOR PROVIDING INVOICES GENERATED THROUGH A BUSINESS INVOICING SYSTEM TO A CUSTOMER USER OF A PERSONAL FINANCIAL MANAGEMENT AND BILL PAYMENT SYSTEM," which is herein incorporated by reference in its entirety as if it were fully set forth herein; and/or U.S. patent application Ser. No. 15/140,131, filed on behalf of the same Inventors of the present patent application, filed on Apr. 27, 2016, entitled "METHOD AND SYSTEM FOR IDENTIFYING INVOICES THAT ARE PAID THROUGH A PERSONAL FINANCIAL MANAGEMENT AND BILL PAYMENT SYSTEM," which is herein incorporated by reference in its entirety as if it were fully set forth herein; and/or U.S. patent application Ser. No. 15/142,708, filed on behalf of the same Inventors of the present patent application, filed on Apr. 29, 2016, entitled "METHOD AND SYSTEM FOR INTEGRATING BUSINESS INVOICES INTO A PERSONAL FINANCIAL MANAGEMENT AND BILL PAYMENT SYSTEM," which is herein incorporated by reference in its entirety as if it were fully set forth herein.

In accordance with one embodiment, the invoice related financial transaction data is integrated into personal financial management and bill payment system payment due data associated with a personal financial management and bill payment system.

In one embodiment, the personal financial management and bill payment system payment due data represents one or more payments due associated with one or more users of the personal financial management and bill payment system as payment due items to be paid through the personal financial management and bill payment system.

In accordance with one embodiment, the invoice related financial transaction data is integrated into personal financial management and bill payment system payment due data associated with a personal financial management and bill payment system by assigning a personal financial management and bill payment system financial transaction category to the discrete invoices represented in the invoice related financial transaction data.

In accordance with one embodiment, the invoice related financial transaction data is integrated into personal financial management and bill payment system payment due data associated with a personal financial management and bill payment system by providing the discrete invoices represented in the invoice related financial transaction data as line items in a payment due item listing generated through the personal financial management and bill payment system.

In accordance with one embodiment, the invoice related financial transaction data is integrated into personal financial management and bill payment system payment due data associated with a personal financial management and bill payment system by assigning a personal financial management and bill payment system financial transaction category to the discrete invoices represented in the invoice related financial transaction data.

In accordance with one embodiment, the invoice related financial transaction data is integrated into personal financial management and bill payment system payment due data associated with a personal financial management and bill payment system by any method, system, process and/or procedure for integrating invoice related financial transaction data into personal financial management and bill payment system payment due data as discussed herein, known in the art at the time of filing, and/or as developed/made available after the time of filing.

In accordance with various embodiments, the invoice related financial transaction data is integrated into personal financial management and bill payment system payment due data associated with a personal financial management and bill payment system by any method, system, process and/or procedure for integrating invoice related financial transaction data into personal financial management and bill payment system payment due data as discussed in: U.S. patent application Ser. No. 15/140,117, filed on behalf of the same Inventors of the present patent application, filed on Apr. 27, 2016, entitled "METHOD AND SYSTEM FOR PROVIDING INVOICES GENERATED THROUGH A BUSINESS INVOICING SYSTEM TO A CUSTOMER USER OF A PERSONAL FINANCIAL MANAGEMENT AND BILL PAYMENT SYSTEM," which is herein incorporated by reference in its entirety as if it were fully set forth herein; and/or U.S. patent application Ser. No. 15/140,131, filed on behalf of the same Inventors of the present patent application, filed on Apr. 27, 2016, entitled "METHOD AND SYSTEM FOR IDENTIFYING INVOICES THAT ARE PAID THROUGH A PERSONAL FINANCIAL MANAGEMENT AND BILL PAYMENT SYSTEM," which is herein incorporated by reference in its entirety as if it were fully set forth herein; and/or U.S. patent application Ser. No. 15/142,708, filed on behalf of the same Inventors of the present patent application, filed on Apr. 29, 2016, entitled "METHOD AND SYSTEM FOR INTEGRATING BUSINESS INVOICES INTO A PERSONAL FINANCIAL MANAGEMENT AND BILL PAYMENT SYSTEM," which is herein incorporated by reference in its entirety as if it were fully set forth herein.

In accordance with one embodiment, access to the personal financial management and bill payment system and the personal financial management and bill payment system payment due data, including the integrated invoice related financial transaction data, is obtained.

In accordance with one embodiment, one or more processors associated with one or more computing systems are utilized to obtain access to the personal financial management and bill payment system and the personal financial management and bill payment system payment due data, including the integrated invoice related financial transaction data.

In accordance with one embodiment, the personal financial management and bill payment system payment due data, including the integrated invoice related financial transaction data, is analyzed to identify first payor user personal financial management and bill payment system payment due data associated with a first payor user of the personal financial management and bill payment system.

In accordance with one embodiment, the first payor user personal financial management and bill payment system payment due data is analyzed to identify first payor user invoice related financial transaction data. In one embodiment, the first payor user invoice related financial transaction data represents two or more discrete invoices submitted by one or more payee businesses requesting payment from the first payor user.

In accordance with one embodiment, the first payor user invoice related financial transaction data is analyzed to identify the payee business identity data associated with each discrete invoice represented in the first payor user invoice related financial transaction data.

In accordance with one embodiment, a first payee business represented in the payee business identity data associated with two or more discrete invoices represented in the first payor user invoice related financial transaction data is identified.

In accordance with one embodiment, all the first payor user invoice related financial transaction data representing the two or more discrete invoices that include payee business identity data identifying the first payee business is aggregated to generate aggregated first payor user/first payee business invoice related financial transaction data.

In accordance with one embodiment, the aggregated first payor user/first payee business invoice related financial transaction data is analyzed to identify the invoice amount data associated with each of the two or more discrete invoices represented in the aggregated first payor user/first payee business invoice related financial transaction data.

In accordance with one embodiment, the invoice amount data associated with each of the two or more discrete invoices represented in the aggregated first payor user/first payee business invoice related financial transaction data is summed to generate aggregated total first payor user/first payee business invoice related financial transaction amount data representing a total amount owed to the first payee business by the first payor user of the personal financial management and bill payment system.

In accordance with one embodiment, the aggregated first payor user/first payee business invoice related financial transaction data and/or aggregated total first payor user/first payee business invoice related financial transaction amount data is then processed as a single first payor user payment due item using the personal financial management and bill payment system.

In accordance with one embodiment, processing the aggregated total first payor user/first payee business invoice related financial transaction amount data as a single first payor user payment due item using the personal financial management and bill payment system includes providing the aggregated total first payor user/first payee business invoice related financial transaction amount data as a line item in a payment due item listing generated through the personal financial management and bill payment system.

In accordance with one embodiment, processing the aggregated total first payor user/first payee business invoice related financial transaction amount data as a single first payor user payment due item using the personal financial management and bill payment system includes applying one or more aggregated first payor user/first payee business invoice related financial transaction data processing rules to the aggregated first payor user/first payee business invoice related financial transaction data.

In accordance with one embodiment, the aggregated first payor user/first payee business invoice related financial transaction data processing rules include, but are not limited to, one or more aggregated first payor user/first payee business invoice related financial transaction data processing rules for processing the aggregated first payor user/first payee business invoice related financial transaction data as a revolving payment, or payment plan, payment due item account.

In this embodiment, groups of discrete invoices can be paid by the payor user on a revolving basis similar to payments made on a credit card account, or merchant credit account.

In accordance with one embodiment, the aggregated first payor user/first payee business invoice related financial transaction data processing rules include, but are not limited to, an aggregated first payor user/first payee business invoice related financial transaction data processing rule limiting the aggregated total first payor user/first payee business invoice related financial transaction amount to a threshold amount.

Using this aggregated first payor user/first payee business invoice related financial transaction data processing rule, the total liability of a payor user is limited to threshold total aggregated invoice amount, thereby capping the financial risk to a payee business of a payor user not paying.

In accordance with one embodiment, the aggregated first payor user/first payee business invoice related financial transaction data processing rules include, but are not limited to, an aggregated first payor user/first payee business invoice related financial transaction data processing rule limiting the total number of unpaid discrete invoices represented in the aggregated first payor user/first payee business invoice related financial transaction data to a threshold number of discrete invoices.

Using this aggregated first payor user/first payee business invoice related financial transaction data processing rule, the total liability of a payor user is limited to a total aggregated invoice amount associated with a threshold number of discrete invoices, thereby capping the financial risk to a payee business of a payor user not paying.

In accordance with one embodiment, the aggregated first payor user/first payee business invoice related financial transaction data processing rules include, but are not limited to, an aggregated first payor user/first payee business invoice related financial transaction data processing rule establishing a maximum age of any of the discrete invoices represented in the aggregated first payor user/first payee business invoice related financial transaction data.

Using this aggregated first payor user/first payee business invoice related financial transaction data processing rule, the payor user is prevented from not paying a given invoice in a timely manner and is therefore encouraged to pay the total aggregated invoice amount so that the financial risk to a payee business is reduced.

In accordance with one embodiment, the aggregated first payor user/first payee business invoice related financial transaction data processing rules include, but are not limited to, an aggregated first payor user/first payee business invoice related financial transaction data processing rule establishing a maximum average age for the discrete invoices represented in the aggregated first payor user/first payee business invoice related financial transaction data.

Using this aggregated first payor user/first payee business invoice related financial transaction data processing rule, the payor user is prevented from not paying multiple invoices in a timely manner and is therefore encouraged to pay the total aggregated invoice amount so that the financial risk to a payee business is reduced.

In accordance with one embodiment, the aggregated first payor user/first payee business invoice related financial transaction data processing rules include, but are not limited to, an aggregated first payor user/first payee business invoice related financial transaction data processing rule establishing a threshold past due age of any of the discrete invoices represented in the aggregated first payor user/first payee business invoice related financial transaction data.

Using this aggregated first payor user/first payee business invoice related financial transaction data processing rule, the payor user is prevented from not paying multiple invoices in a timely manner and is therefore encouraged to pay the total aggregated invoice amount so that the financial risk to a payee business is reduced.

In accordance with one embodiment, the aggregated first payor user/first payee business invoice related financial transaction data processing rules include any aggregated first payor user/first payee business invoice related financial transaction data processing rules desired, and/or as discussed herein, known in the art at the time of filing, and/or as developed/made available after the time of filing.

FIG. 1 is a high level functionality-based block diagram of a hardware and production environment 100 for integrating discrete invoices into a personal financial management and bill payment system and then aggregating discrete invoices having the same payor user and the same payee business into a single payment due item for processing, in accordance with one embodiment.

As seen in FIG. 1, in this specific illustrative example, production environment 100 includes: personal financial management and bill payment system computing system environment 110, including personal financial management and bill payment system 111; business invoicing system computing system environment 120, including business invoicing system 121; and process computing system environment 130, including process computing system 131.

As seen in FIG. 1, in the specific illustrative example of FIG. 1, personal financial management and bill payment system 111 includes personal financial management and bill payment system payment due data 113 associated with one or more users of personal financial management and bill payment system 111.

In one embodiment, personal financial management and bill payment system payment due data 113 represents one or more bills associated with one or more users (not shown) of personal financial management and bill payment system 111 to be paid through personal financial management and bill payment system 111. In one embodiment, personal financial management and bill payment system payment due data 113 includes data representing a payment due item listing (not shown).

As seen in FIG. 1, in the specific illustrative example of FIG. 1, business invoicing system 121 includes invoice related financial transaction data 123 generated by the one or more payee businesses (not shown). In one embodiment, invoice related financial transaction data 123 represents two or more discrete invoices (not shown) submitted by one or more payee businesses (not shown) requesting payment by one or more payor users (not shown) of personal financial management and bill payment system 111.

In one embodiment, invoice related financial transaction data 123 includes payee business identity data associated with each discrete invoice represented in the invoice related financial transaction data (not shown). In one embodiment, the payee business identity data represents the identity of the payee business associated with each discrete invoice represented in the invoice related financial transaction data.

In one embodiment, invoice related financial transaction data 123 also includes payor user identity data associated with each discrete invoice represented in the invoice related financial transaction data (not shown). In one embodiment, the payor user identity data represents the identity of the payor user associated with each discrete invoice represented in the invoice related financial transaction data.

In one embodiment, invoice related financial transaction data 123 further includes invoice amount data associated with each discrete invoice represented in the invoice related financial transaction data (not shown). In one embodiment, the invoice amount data represents the payment amount associated with each discrete invoice represented in the invoice related financial transaction data.

As seen in FIG. 1, in the specific illustrative example of FIG. 1, process computing system 131 includes personal financial management and bill payment system access module 133 for obtaining access to personal financial management and bill payment system payment due data 113.

As seen in FIG. 1, in the specific illustrative example of FIG. 1, process computing system 131 includes business invoicing system access module 134, i.e., one example of an invoice related financial transaction data acquisition module, for obtaining access to invoice related financial transaction data 123.

As seen in FIG. 1, in the specific illustrative example of FIG. 1, process computing system 131 includes integration module 135 for integrating invoice related financial transaction data 123 data into personal financial management and bill payment system payment due data 113 associated with personal financial management and bill payment system 111.

As seen in FIG. 1, in the specific illustrative example of FIG. 1, process computing system 131 includes first payor user invoice related financial transaction data identification module 137 for analyzing personal financial management and bill payment system payment due data 113, including invoice related financial transaction data 123, to identify first payor user invoice related financial transaction data 143.

In one embodiment, first payor user invoice related financial transaction data 143 represents two or more discrete invoices (not shown) submitted by one or more payee businesses (not shown) requesting payment from the first payor user (not shown) of personal financial management and bill payment system 111.

As seen in FIG. 1, in the specific illustrative example of FIG. 1, process computing system 131 includes payee business identity data identification module 139 for analyzing first payor user invoice related financial transaction data 143 to identify payee business identity data 140 associated with each discrete invoice represented in first payor user invoice related financial transaction data 143 and identify a first payee business represented in payee business identity data 140 associated with two or more discrete invoices represented in first payor user invoice related financial transaction data 143.

As seen in FIG. 1, in the specific illustrative example of FIG. 1, process computing system 131 includes aggregation module 151 for aggregating all the first payor user invoice related financial transaction data representing the two or more discrete invoices that include payee business identity data 140 identifying the first payee business to generate aggregated first payor user/first payee business invoice related financial transaction data 153.

As seen in FIG. 1, in the specific illustrative example of FIG. 1, process computing system 131 includes invoice amount data identification module 155 for analyzing aggregated first payor user/first payee business invoice related financial transaction data 153 to identify the invoice amount data (not shown) associated with each of the two or more discrete invoices represented in aggregated first payor user/first payee business invoice related financial transaction data 153.

As seen in FIG. 1, in the specific illustrative example of FIG. 1, process computing system 131 includes total first payor user/first payee business invoice related financial transaction amount calculation module 157 for adding the invoice amount data associated with each of the two or more discrete invoices represented in aggregated first payor user/first payee business invoice related financial transaction data 153 to generate aggregated total first payor user/first payee business invoice related financial transaction amount data 159 representing a total amount owed to the first payee business by the first payor user of personal financial management and bill payment system 111.

As seen in FIG. 1, in the specific illustrative example of FIG. 1, process computing system 131 includes aggregated first payor user/first payee business invoice related financial transaction data processing module 161 for processing aggregated total first payor user/first payee business invoice related financial transaction amount data 159 as a single first payor user payment due item (not shown) using personal financial management and bill payment system 111.

Using the disclosed embodiments, invoices represented in invoice related financial transaction data can be integrated and processed by the personal financial management and bill payment system at minimal cost to the user of the personal financial management and bill payment system, and in a seamless and effective manner.

Therefore, the disclosed embodiments provide an efficient, effective, and highly adaptable solution to the long standing technical problem in the bill payment, invoice processing, and financial management arts of automatically integrating invoice related financial transaction data into a personal financial management and bill payment system and/or identifying, or distinguishing, invoice related financial transaction data, and then aggregating invoices represented in the invoice related financial transaction data having the same payor user and the same payee business into single payment due item.

Process

In accordance with one embodiment, invoice related financial transaction data is obtained and integrated into a personal financial management and bill payment system. Then, all invoices represented in the invoice related financial transaction data having the same payor user of the personal financial management and bill payment system and the same payee business are identified and collected into aggregated same payor/same payee invoice related financial transaction data. In one embodiment, the aggregated same payor/same payee invoice related financial transaction data is then analyzed to determine the aggregated total amount owed to the payee business by the payor user and this aggregated total amount is processed as a single payment due item by the personal financial management and bill payment system.

Consequently, using the disclosed embodiments, invoices represented in invoice related financial transaction data can be integrated and processed by the personal financial management and bill payment system at minimal cost to the user of the personal financial management and bill payment system, and in a seamless and effective manner.

Therefore, the disclosed embodiments provide an efficient, effective, and highly adaptable solution to the long standing technical problem in the bill payment, invoice processing, and financial management arts of automatically integrating invoice related financial transaction data into a personal financial management and bill payment system and/or identifying, or distinguishing, invoice related financial transaction data, and then aggregating invoices represented in the invoice related financial transaction data having the same payor user and the same payee business into single payment due item.

Figure 2:
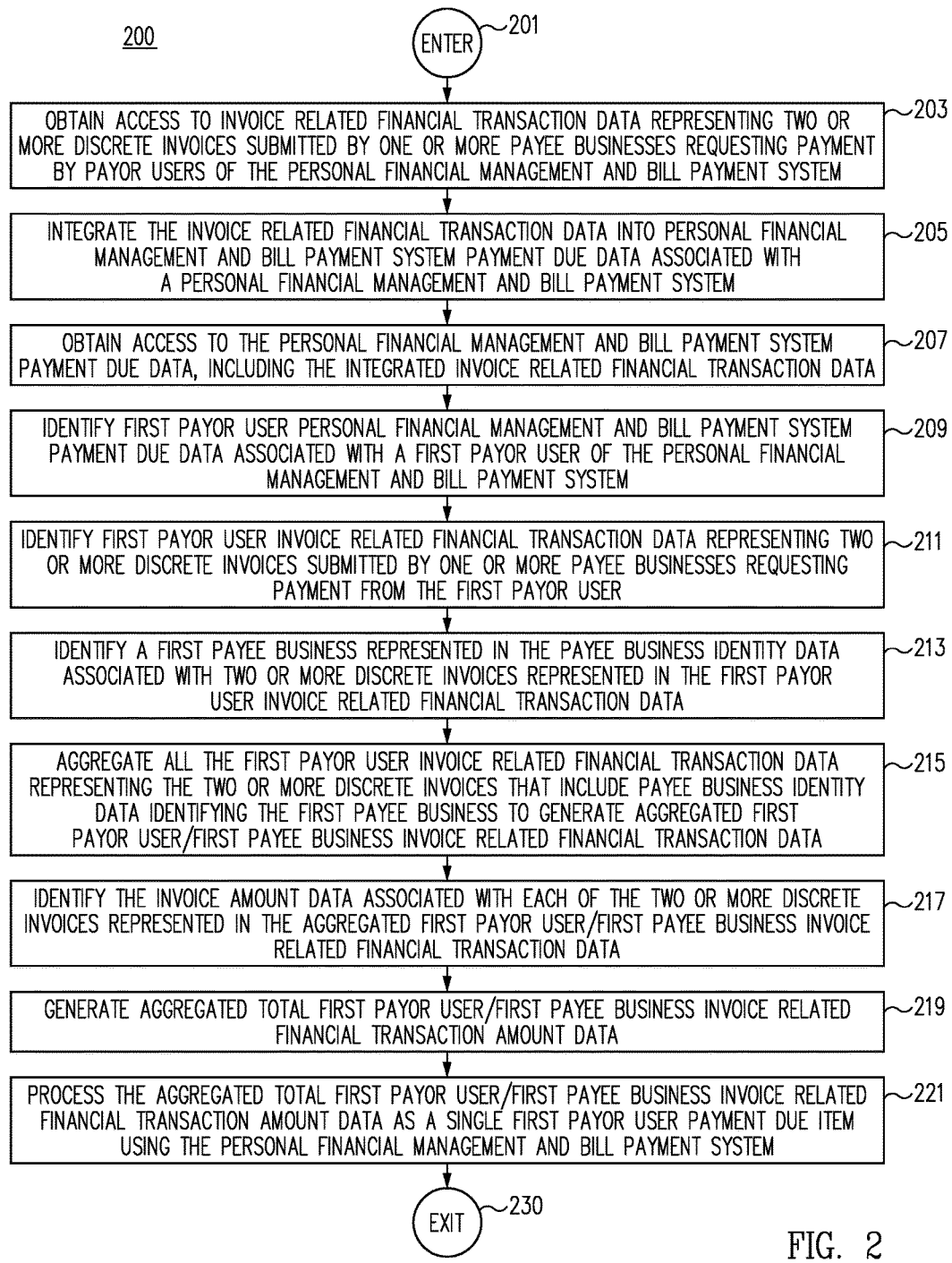
FIG. 2 is a flow chart representing one example of a generalized process for integrating discrete invoices into a personal financial management and bill payment system and then aggregating discrete invoices having the same payor user and the same payee business into a single payment due item for processing, in accordance with one embodiment.

FIG. 2 is a flow chart representing one example of a process 200 for integrating discrete invoices into a personal financial management and bill payment system and then aggregating discrete invoices having the same payor user and the same payee business into a single payment due item for processing in accordance with one embodiment.

As seen in FIG. 2, process 200 for integrating discrete invoices into a personal financial management and bill payment system and then aggregating discrete invoices having the same payor user and the same payee business into a single payment due item for processing begins at ENTER OPERATION 201 and process flow proceeds to OBTAIN ACCESS TO INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT BY PAYOR USERS OF THE PERSONAL FINANCIAL MANAGEMENT AND BILL PAYMENT SYSTEM OPERATION 203.

In one embodiment, at OBTAIN ACCESS TO INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT BY PAYOR USERS OF THE PERSONAL FINANCIAL MANAGEMENT AND BILL PAYMENT SYSTEM OPERATION 203, access to invoice related financial transaction data generated by the one or more payee businesses is obtained.

In one embodiment, the obtained invoice related financial transaction data of OBTAIN ACCESS TO INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT BY PAYOR USERS OF THE PERSONAL FINANCIAL MANAGEMENT AND BILL PAYMENT SYSTEM OPERATION 203 represents two or more discrete invoices submitted by one or more payee businesses requesting payment by one or more payor users of the personal financial management and bill payment system.

In one embodiment, the invoice related financial transaction data of OBTAIN ACCESS TO INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT BY PAYOR USERS OF THE PERSONAL FINANCIAL MANAGEMENT AND BILL PAYMENT SYSTEM OPERATION 203 includes payee business identity data associated with each discrete invoice represented in the invoice related financial transaction data. In one embodiment, the payee business identity data represents the identity of the payee business associated with each discrete invoice represented in the invoice related financial transaction data.

In one embodiment, the invoice related financial transaction data of OBTAIN ACCESS TO INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT BY PAYOR USERS OF THE PERSONAL FINANCIAL MANAGEMENT AND BILL PAYMENT SYSTEM OPERATION 203 also includes payor user identity data associated with each discrete invoice represented in the invoice related financial transaction data. In one embodiment, the payor user identity data represents the identity of the payor user associated with each discrete invoice represented in the invoice related financial transaction data.

In one embodiment, the invoice related financial transaction data of OBTAIN ACCESS TO INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT BY PAYOR USERS OF THE PERSONAL FINANCIAL MANAGEMENT AND BILL PAYMENT SYSTEM OPERATION 203 further includes invoice amount data associated with each discrete invoice represented in the invoice related financial transaction data. In one embodiment, the invoice amount data represents the payment amount associated with each discrete invoice represented in the invoice related financial transaction data.

In accordance with one embodiment, at OBTAIN ACCESS TO INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT BY PAYOR USERS OF THE PERSONAL FINANCIAL MANAGEMENT AND BILL PAYMENT SYSTEM OPERATION 203 the invoice related financial transaction data generated by the one or more payee businesses is obtained from a business invoicing system provided to business users of the business invoicing system.

In accordance with one embodiment, at OBTAIN ACCESS TO INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT BY PAYOR USERS OF THE PERSONAL FINANCIAL MANAGEMENT AND BILL PAYMENT SYSTEM OPERATION 203 one or more processors associated with one or more computing systems are utilized to obtain access to the business invoicing system and obtain invoice related financial transaction data generated by the one or more payee businesses.

In accordance with one embodiment, obtaining access to invoice related financial transaction data generated by the one or more payee businesses at OBTAIN ACCESS TO INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT BY PAYOR USERS OF THE PERSONAL FINANCIAL MANAGEMENT AND BILL PAYMENT SYSTEM OPERATION 203 includes, but is not limited to:

a. obtaining access to personal financial management and bill payment system user financial transaction data associated with the personal financial management and bill payment system, the personal financial management and bill payment system user financial transaction data representing financial transactions associated with users of a personal financial management and bill payment system;

b. analyzing the personal financial management and bill payment system user financial transaction data associated with the first payor user to identify payee data included in the financial transaction data associated with the first payor user, the payee data representing one or more payees associated with first payor user financial transactions associated with the first payor user represented by a portion of the personal financial management and bill payment system user financial transaction data associated with the first payor user;

c. obtaining access to business invoicing system business user identification data associated with a business invoicing system, the business user identification data representing business users of the business invoicing system;

d. accessing the payee data and the business user identification data and analyzing the payee data and business user identification data to determine if a payee represented in the payee data matches a business user of the business invoicing system represented in the business user identification data;

e. identifying a payee represented in the payee data that matches a business user of the business invoicing system represented in the business user identification data, the payee being a payee associated with first financial transaction data representing a first financial transaction included in the personal financial management and bill payment system user financial transaction data associated with the first payor user;

f. designating the payee represented in the payee data that matches the business user of the business invoicing system as a first payee business;

g. transforming status data associated with the first financial transaction data representing the first financial transaction to first invoice related financial transaction data;

h. processing the first invoice related financial transaction data as invoice related financial transaction data; and i. providing the first payee business the capability to provide invoicing data representing invoices generated by first payee business to the first payor user of the personal financial management and bill payment system through the personal financial management and bill payment system.

In accordance with one embodiment, obtaining access to invoice related financial transaction data generated by the one or more payee businesses at OBTAIN ACCESS TO INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT BY PAYOR USERS OF THE PERSONAL FINANCIAL MANAGEMENT AND BILL PAYMENT SYSTEM OPERATION 203 includes, but is not limited to:

a. obtaining access to personal financial management and bill payment system user identification data associated with users of a personal financial management and bill payment system;

b. obtaining access to invoicing data generated through a business invoicing system, the invoicing data representing invoices sent from payee business users of the business invoicing system to payor customers of the payee business users of the business invoicing system;

c. monitoring the invoicing data and identifying first invoice data representing an invoice generated by a first payee business user of the business invoicing system associated with a first payor customer of the first payee business user of the business invoicing system;

d. analyzing the first invoice data to identify first payor customer identification data associated with the first payor customer of the first payee business user of the business invoicing system;

e. analyzing the personal financial management and bill payment system user identification data and the first payor customer identification data to determine if the first payor customer associated with the first payor customer identification data is a first payor user of the personal financial management and bill payment system;

f. if a determination is made that the first payor customer associated with the first payor customer identification data is a first payor user of the personal financial management and bill payment system, designating the first payor customer as a first payor user of the personal financial management and bill payment system; and g. providing the first payee business user of the business invoicing system the capability to provide invoicing data representing invoices generated by the first payee business user of the business invoicing system to the first payor user of the personal financial management and bill payment system through the personal financial management and bill payment system.

In accordance with one embodiment, obtaining access to invoice related financial transaction data generated by the one or more payee businesses at OBTAIN ACCESS TO INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT BY PAYOR USERS OF THE PERSONAL FINANCIAL MANAGEMENT AND BILL PAYMENT SYSTEM OPERATION 203 includes, but is not limited to:

a. obtaining access to personal financial management and bill payment system user identification data associated with users of a personal financial management and bill payment system;

b. obtaining access to business invoicing system payor customer identification data generated through a business invoicing system, the business invoicing system payor customer identification data being associated with payor customers of user payee businesses of a business invoicing system;

c. analyzing the personal financial management and bill payment system user identification data and the business invoicing system payor customer identification data to identify payor users of the personal financial management and bill payment system that are payor customers of business users of the business invoicing system;

d. identifying a payor user of the personal financial management and bill payment system that is a payor customer of a payee business user of the business invoicing system;

e. designating the payor user of the personal financial management and bill payment system a first payor user of the personal financial management and bill payment system;

f. providing the first payor user of the personal financial management and bill payment system the opportunity to integrate invoices generated by the first payee business user of the business invoicing system into the personal financial management and bill payment system; and g. if the first payor user of the personal financial management and bill payment system agrees to integrate invoices generated by the first payee business user of the business invoicing system into the personal financial management and bill payment system, providing the first payee business user of the business invoicing system the capability to provide invoice data representing invoices generated by the first payee business user of the business invoicing system to the first payor user of the personal financial management and bill payment system through the personal financial management and bill payment system.

In accordance with one embodiment, obtaining access to invoice related financial transaction data generated by the one or more payee businesses at OBTAIN ACCESS TO INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT BY PAYOR USERS OF THE PERSONAL FINANCIAL MANAGEMENT AND BILL PAYMENT SYSTEM OPERATION 203 includes any method, system, process and/or procedure for obtaining access to invoice related financial transaction data generated by the one or more payee businesses as discussed herein, known in the art at the time of filing, and/or as developed/made available after the time of filing.

In accordance with one embodiment, obtaining access to invoice related financial transaction data generated by the one or more payee businesses at OBTAIN ACCESS TO INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT BY PAYOR USERS OF THE PERSONAL FINANCIAL MANAGEMENT AND BILL PAYMENT SYSTEM OPERATION 203 includes any method, system, process and/or procedure for obtaining access to invoice related financial transaction data generated by the one or more payee businesses as discussed in: U.S. patent application Ser. No. 15/140,117, filed on behalf of the same Inventors of the present patent application, filed on Apr. 27, 2016, entitled "METHOD AND SYSTEM FOR PROVIDING INVOICES GENERATED THROUGH A BUSINESS INVOICING SYSTEM TO A CUSTOMER USER OF A PERSONAL FINANCIAL MANAGEMENT AND BILL PAYMENT SYSTEM," which is herein incorporated by reference in its entirety as if it were fully set forth herein; and/or U.S. patent application Ser. No. 15/140,131, filed on behalf of the same Inventors of the present patent application, filed on Apr. 27, 2016, entitled "METHOD AND SYSTEM FOR IDENTIFYING INVOICES THAT ARE PAID THROUGH A PERSONAL FINANCIAL MANAGEMENT AND BILL PAYMENT SYSTEM," which is herein incorporated by reference in its entirety as if it were fully set forth herein; and/or U.S. patent application Ser. No. 15/142,708, filed on behalf of the same Inventors of the present patent application, filed on Apr. 29, 2016, entitled "METHOD AND SYSTEM FOR INTEGRATING BUSINESS INVOICES INTO A PERSONAL FINANCIAL MANAGEMENT AND BILL PAYMENT SYSTEM," which is herein incorporated by reference in its entirety as if it were fully set forth herein.

In one embodiment once access to invoice related financial transaction data generated by the one or more payee businesses is obtained at OBTAIN ACCESS TO INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT BY PAYOR USERS OF THE PERSONAL FINANCIAL MANAGEMENT AND BILL PAYMENT SYSTEM OPERATION 203, process flow proceeds to INTEGRATE THE INVOICE RELATED FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205.

In one embodiment, at INTEGRATE THE INVOICE RELATED FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205, the invoice related financial transaction data is integrated into personal financial management and bill payment system payment due data associated with a personal financial management and bill payment system.

In one embodiment, a personal financial management and bill payment system is provided using one or more computing systems.

In accordance with one embodiment, at INTEGRATE THE INVOICE RELATED FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205 the invoice related financial transaction data is integrated into personal financial management and bill payment system payment due data associated with the personal financial management and bill payment system using one or more processors associated with one or more computing systems.

In one embodiment, the personal financial management and bill payment system payment due data represents one or more payments due associated with one or more users of the personal financial management and bill payment system as payment due items to be paid through the personal financial management and bill payment system.

In accordance with one embodiment, the invoice related financial transaction data is integrated into personal financial management and bill payment system payment due data associated with a personal financial management and bill payment system at INTEGRATE THE INVOICE RELATED FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205 by assigning a personal financial management and bill payment system financial transaction category to the discrete invoices represented in the invoice related financial transaction data.

In accordance with one embodiment, the invoice related financial transaction data is integrated into personal financial management and bill payment system payment due data associated with a personal financial management and bill payment system at INTEGRATE THE INVOICE RELATED FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205 by providing the discrete invoices represented in the invoice related financial transaction data as line items in a payment due item listing generated through the personal financial management and bill payment system.

In accordance with one embodiment, the invoice related financial transaction data is integrated into personal financial management and bill payment system payment due data associated with a personal financial management and bill payment system at INTEGRATE THE INVOICE RELATED FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205 by assigning a personal financial management and bill payment system financial transaction category to the discrete invoices represented in the invoice related financial transaction data.

In accordance with one embodiment, the invoice related financial transaction data is integrated into personal financial management and bill payment system payment due data associated with a personal financial management and bill payment system at INTEGRATE THE INVOICE RELATED FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205 by any method, system, process and/or procedure for integrating invoice related financial transaction data into personal financial management and bill payment system payment due data as discussed herein, known in the art at the time of filing, and/or as developed/made available after the time of filing.

In accordance with various embodiments, the invoice related financial transaction data is integrated into personal financial management and bill payment system payment due data associated with a personal financial management and bill payment system at INTEGRATE THE INVOICE RELATED FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205 by any method, system, process and/or procedure for integrating invoice related financial transaction data into personal financial management and bill payment system payment due data as discussed in: U.S. patent application Ser. No. 15/140,117, filed on behalf of the same Inventors of the present patent application, filed on Apr. 27, 2016, entitled "METHOD AND SYSTEM FOR PROVIDING INVOICES GENERATED THROUGH A BUSINESS INVOICING SYSTEM TO A CUSTOMER USER OF A PERSONAL FINANCIAL MANAGEMENT AND BILL PAYMENT SYSTEM," which is herein incorporated by reference in its entirety as if it were fully set forth herein; and/or U.S. patent application Ser. No. 15/140,131, filed on behalf of the same Inventors of the present patent application, filed on Apr. 27, 2016, entitled "METHOD AND SYSTEM FOR IDENTIFYING INVOICES THAT ARE PAID THROUGH A PERSONAL FINANCIAL MANAGEMENT AND BILL PAYMENT SYSTEM," which is herein incorporated by reference in its entirety as if it were fully set forth herein; and/or U.S. patent application Ser. No. 15/142,708, filed on behalf of the same Inventors of the present patent application, filed on Apr. 29, 2016, entitled "METHOD AND SYSTEM FOR INTEGRATING BUSINESS INVOICES INTO A PERSONAL FINANCIAL MANAGEMENT AND BILL PAYMENT SYSTEM," which is herein incorporated by reference in its entirety as if it were fully set forth herein.

In one embodiment, once the invoice related financial transaction data is integrated into personal financial management and bill payment system payment due data associated with a personal financial management and bill payment system at INTEGRATE THE INVOICE RELATED FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205, process flow proceeds to OBTAIN ACCESS TO THE PERSONAL FINANCIAL MANAGEMENT AND BILL PAYMENT SYSTEM PAYMENT DUE DATA, INCLUDING THE INTEGRATED INVOICE RELATED FINANCIAL TRANSACTION DATA OPERATION 207.

In one embodiment, at OBTAIN ACCESS TO THE PERSONAL FINANCIAL MANAGEMENT AND BILL PAYMENT SYSTEM PAYMENT DUE DATA, INCLUDING THE INTEGRATED INVOICE RELATED FINANCIAL TRANSACTION DATA OPERATION 207, access to the personal financial management and bill payment system and the personal financial management and bill payment system payment due data, including the integrated invoice related financial transaction data, is obtained.

In accordance with one embodiment, at OBTAIN ACCESS TO THE PERSONAL FINANCIAL MANAGEMENT AND BILL PAYMENT SYSTEM PAYMENT DUE DATA, INCLUDING THE INTEGRATED INVOICE RELATED FINANCIAL TRANSACTION DATA OPERATION 207 one or more processors associated with one or more computing systems are utilized to obtain access to the personal financial management and bill payment system and the personal financial management and bill payment system payment due data, including the integrated invoice related financial transaction data.

In one embodiment, once access to the personal financial management and bill payment system and the personal financial management and bill payment system payment due data, including the integrated invoice related financial transaction data, is obtained at OBTAIN ACCESS TO THE PERSONAL FINANCIAL MANAGEMENT AND BILL PAYMENT SYSTEM PAYMENT DUE DATA, INCLUDING THE INTEGRATED INVOICE RELATED FINANCIAL TRANSACTION DATA OPERATION 207, process flow proceeds to IDENTIFY FIRST PAYOR USER PERSONAL FINANCIAL MANAGEMENT AND BILL PAYMENT SYSTEM PAYMENT DUE DATA ASSOCIATED WITH A FIRST PAYOR USER OF THE PERSONAL FINANCIAL MANAGEMENT AND BILL PAYMENT SYSTEM OPERATION 209.

In one embodiment, at IDENTIFY FIRST PAYOR USER PERSONAL FINANCIAL MANAGEMENT AND BILL PAYMENT SYSTEM PAYMENT DUE DATA ASSOCIATED WITH A FIRST PAYOR USER OF THE PERSONAL FINANCIAL MANAGEMENT AND BILL PAYMENT SYSTEM OPERATION 209, the personal financial management and bill payment system payment due data, including the integrated invoice related financial transaction data, of OBTAIN ACCESS TO THE PERSONAL FINANCIAL MANAGEMENT AND BILL PAYMENT SYSTEM PAYMENT DUE DATA, INCLUDING THE INTEGRATED INVOICE RELATED FINANCIAL TRANSACTION DATA OPERATION 207 is analyzed to identify first payor user personal financial management and bill payment system payment due data associated with a first payor user of the personal financial management and bill payment system.

In one embodiment, once the personal financial management and bill payment system payment due data, including the integrated invoice related financial transaction data, is analyzed to identify first payor user personal financial management and bill payment system payment due data associated with a first payor user of the personal financial management and bill payment system at IDENTIFY FIRST PAYOR USER PERSONAL FINANCIAL MANAGEMENT AND BILL PAYMENT SYSTEM PAYMENT DUE DATA ASSOCIATED WITH A FIRST PAYOR USER OF THE PERSONAL FINANCIAL MANAGEMENT AND BILL PAYMENT SYSTEM OPERATION 209, process flow proceeds to IDENTIFY FIRST PAYOR USER INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT FROM THE FIRST PAYOR USER OPERATION 211.

In one embodiment, at IDENTIFY FIRST PAYOR USER INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT FROM THE FIRST PAYOR USER OPERATION 211, the first payor user personal financial management and bill payment system payment due data of IDENTIFY FIRST PAYOR USER PERSONAL FINANCIAL MANAGEMENT AND BILL PAYMENT SYSTEM PAYMENT DUE DATA ASSOCIATED WITH A FIRST PAYOR USER OF THE PERSONAL FINANCIAL MANAGEMENT AND BILL PAYMENT SYSTEM OPERATION 209 is analyzed to identify first payor user invoice related financial transaction data. In one embodiment, the first payor user invoice related financial transaction data represents two or more discrete invoices submitted by one or more payee businesses requesting payment from the first payor user.

In one embodiment, once the first payor user personal financial management and bill payment system payment due data is analyzed to identify first payor user invoice related financial transaction data. In one embodiment, the first payor user invoice related financial transaction data represents two or more discrete invoices submitted by one or more payee businesses requesting payment from the first payor user at IDENTIFY FIRST PAYOR USER INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT FROM THE FIRST PAYOR USER OPERATION 211, process flow proceeds to IDENTIFY A FIRST PAYEE BUSINESS REPRESENTED IN THE PAYEE BUSINESS IDENTITY DATA ASSOCIATED WITH TWO OR MORE DISCRETE INVOICES REPRESENTED IN THE FIRST PAYOR USER INVOICE RELATED FINANCIAL TRANSACTION DATA OPERATION 213.

In one embodiment, at IDENTIFY A FIRST PAYEE BUSINESS REPRESENTED IN THE PAYEE BUSINESS IDENTITY DATA ASSOCIATED WITH TWO OR MORE DISCRETE INVOICES REPRESENTED IN THE FIRST PAYOR USER INVOICE RELATED FINANCIAL TRANSACTION DATA OPERATION 213, the first payor user invoice related financial transaction data of IDENTIFY FIRST PAYOR USER INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT FROM THE FIRST PAYOR USER OPERATION 211 is analyzed to identify the payee business identity data associated with each discrete invoice represented in the first payor user invoice related financial transaction data and a first payee business represented in the payee business identity data associated with two or more discrete invoices represented in the first payor user invoice related financial transaction data is identified.

In one embodiment, once the first payor user invoice related financial transaction data is analyzed to identify the payee business identity data associated with each discrete invoice represented in the first payor user invoice related financial transaction data and a first payee business represented in the payee business identity data associated with two or more discrete invoices represented in the first payor user invoice related financial transaction data is identified at IDENTIFY A FIRST PAYEE BUSINESS REPRESENTED IN THE PAYEE BUSINESS IDENTITY DATA ASSOCIATED WITH TWO OR MORE DISCRETE INVOICES REPRESENTED IN THE FIRST PAYOR USER INVOICE RELATED FINANCIAL TRANSACTION DATA OPERATION 213, process flow proceeds to AGGREGATE ALL THE FIRST PAYOR USER INVOICE RELATED FINANCIAL TRANSACTION DATA REPRESENTING THE TWO OR MORE DISCRETE INVOICES THAT INCLUDE PAYEE BUSINESS IDENTITY DATA IDENTIFYING THE FIRST PAYEE BUSINESS TO GENERATE AGGREGATED FIRST PAYOR USER/FIRST PAYEE BUSINESS INVOICE RELATED FINANCIAL TRANSACTION DATA OPERATION 215.

In one embodiment, at AGGREGATE ALL THE FIRST PAYOR USER INVOICE RELATED FINANCIAL TRANSACTION DATA REPRESENTING THE TWO OR MORE DISCRETE INVOICES THAT INCLUDE PAYEE BUSINESS IDENTITY DATA IDENTIFYING THE FIRST PAYEE BUSINESS TO GENERATE AGGREGATED FIRST PAYOR USER/FIRST PAYEE BUSINESS INVOICE RELATED FINANCIAL TRANSACTION DATA OPERATION 215, all the first payor user invoice related financial transaction data representing the two or more discrete invoices of IDENTIFY FIRST PAYOR USER INVOICE RELATED FINANCIAL TRANSACTION DATA REPRESENTING TWO OR MORE DISCRETE INVOICES SUBMITTED BY ONE OR MORE PAYEE BUSINESSES REQUESTING PAYMENT FROM THE FIRST PAYOR USER OPERATION 211 that include payee business identity data identifying the first payee business of IDENTIFY A FIRST PAYEE BUSINESS REPRESENTED IN THE PAYEE BUSINESS IDENTITY DATA ASSOCIATED WITH TWO OR MORE DISCRETE INVOICES REPRESENTED IN THE FIRST PAYOR USER INVOICE RELATED FINANCIAL TRANSACTION DATA OPERATION 213 is aggregated to generate aggregated first payor user/first payee business invoice related financial transaction data.

In one embodiment, once all the first payor user invoice related financial transaction data representing the two or more discrete invoices that include payee business identity data identifying the first payee business is aggregated to generate aggregated first payor user/first payee business invoice related financial transaction data at AGGREGATE ALL THE FIRST PAYOR USER INVOICE RELATED FINANCIAL TRANSACTION DATA REPRESENTING THE TWO OR MORE DISCRETE INVOICES THAT INCLUDE PAYEE BUSINESS IDENTITY DATA IDENTIFYING THE FIRST PAYEE BUSINESS TO GENERATE AGGREGATED FIRST PAYOR USER/FIRST PAYEE BUSINESS INVOICE RELATED FINANCIAL TRANSACTION DATA OPERATION 215, process flow proceeds to IDENTIFY THE INVOICE AMOUNT DATA ASSOCIATED WITH EACH OF THE TWO OR MORE DISCRETE INVOICES REPRESENTED IN THE AGGREGATED FIRST PAYOR USER/FIRST PAYEE BUSINESS INVOICE RELATED FINANCIAL TRANSACTION DATA OPERATION 217.

In one embodiment, at IDENTIFY THE INVOICE AMOUNT DATA ASSOCIATED WITH EACH OF THE TWO OR MORE DISCRETE INVOICES REPRESENTED IN THE AGGREGATED FIRST PAYOR USER/FIRST PAYEE BUSINESS INVOICE RELATED FINANCIAL TRANSACTION DATA OPERATION 217, the aggregated first payor user/first payee business invoice related financial transaction data of AGGREGATE ALL THE FIRST PAYOR USER INVOICE RELATED FINANCIAL TRANSACTION DATA REPRESENTING THE TWO OR MORE DISCRETE INVOICES THAT INCLUDE PAYEE BUSINESS IDENTITY DATA IDENTIFYING THE FIRST PAYEE BUSINESS TO GENERATE AGGREGATED FIRST PAYOR USER/FIRST PAYEE BUSINESS INVOICE RELATED FINANCIAL TRANSACTION DATA OPERATION 215 is analyzed to identify the invoice amount data associated with each of the two or more discrete invoices represented in the aggregated first payor user/first payee business invoice related financial transaction data.

In one embodiment, once the aggregated first payor user/first payee business invoice related financial transaction data is analyzed to identify the invoice amount data associated with each of the two or more discrete invoices represented in the aggregated first payor user/first payee business invoice related financial transaction data at IDENTIFY THE INVOICE AMOUNT DATA ASSOCIATED WITH EACH OF THE TWO OR MORE DISCRETE INVOICES REPRESENTED IN THE AGGREGATED FIRST PAYOR USER/FIRST PAYEE BUSINESS INVOICE RELATED FINANCIAL TRANSACTION DATA OPERATION 217, process flow proceeds to GENERATE AGGREGATED TOTAL FIRST PAYOR USER/FIRST PAYEE BUSINESS INVOICE RELATED FINANCIAL TRANSACTION AMOUNT DATA OPERATION 219.

In one embodiment, at GENERATE AGGREGATED TOTAL FIRST PAYOR USER/FIRST PAYEE BUSINESS INVOICE RELATED FINANCIAL TRANSACTION AMOUNT DATA OPERATION 219, the invoice amount data associated with each of the two or more discrete invoices represented in the aggregated first payor user/first payee business invoice related financial transaction data of IDENTIFY THE INVOICE AMOUNT DATA ASSOCIATED WITH EACH OF THE TWO OR MORE DISCRETE INVOICES REPRESENTED IN THE AGGREGATED FIRST PAYOR USER/FIRST PAYEE BUSINESS INVOICE RELATED FINANCIAL TRANSACTION DATA OPERATION 217 is summed to generate aggregated total first payor user/first payee business invoice related financial transaction amount data representing a total amount owed to the first payee business by the first payor user of the personal financial management and bill payment system.

In one embodiment, once the invoice amount data associated with each of the two or more discrete invoices represented in the aggregated first payor user/first payee business invoice related financial transaction data is summed to generate aggregated total first payor user/first payee business invoice related financial transaction amount data representing a total amount owed to the first payee business by the first payor user of the personal financial management and bill payment system at GENERATE AGGREGATED TOTAL FIRST PAYOR USER/FIRST PAYEE BUSINESS INVOICE RELATED FINANCIAL TRANSACTION AMOUNT DATA OPERATION 219, process flow proceeds to PROCESS THE AGGREGATED TOTAL FIRST PAYOR USER/FIRST PAYEE BUSINESS INVOICE RELATED FINANCIAL TRANSACTION AMOUNT DATA AS A SINGLE FIRST PAYOR USER PAYMENT DUE ITEM USING THE PERSONAL FINANCIAL MANAGEMENT AND BILL PAYMENT SYSTEM OPERATION 221.

In one embodiment, at PROCESS THE AGGREGATED TOTAL FIRST PAYOR USER/FIRST PAYEE BUSINESS INVOICE RELATED FINANCIAL TRANSACTION AMOUNT DATA AS A SINGLE FIRST PAYOR USER PAYMENT DUE ITEM USING THE PERSONAL FINANCIAL MANAGEMENT AND BILL PAYMENT SYSTEM OPERATION 221, the aggregated total first payor user/first payee business invoice related financial transaction amount data of AGGREGATE ALL THE FIRST PAYOR USER INVOICE RELATED FINANCIAL TRANSACTION DATA REPRESENTING THE TWO OR MORE DISCRETE INVOICES THAT INCLUDE PAYEE BUSINESS IDENTITY DATA IDENTIFYING THE FIRST PAYEE BUSINESS TO GENERATE AGGREGATED FIRST PAYOR USER/FIRST PAYEE BUSINESS INVOICE RELATED FINANCIAL TRANSACTION DATA OPERATION 215 is processed as a single first payor user payment due item using the personal financial management and bill payment system.

In accordance with one embodiment, processing the aggregated total first payor user/first payee business invoice related financial transaction amount data as a single first payor user payment due item using the personal financial management and bill payment system at PROCESS THE AGGREGATED TOTAL FIRST PAYOR USER/FIRST PAYEE BUSINESS INVOICE RELATED FINANCIAL TRANSACTION AMOUNT DATA AS A SINGLE FIRST PAYOR USER PAYMENT DUE ITEM USING THE PERSONAL FINANCIAL MANAGEMENT AND BILL PAYMENT SYSTEM OPERATION 221 includes providing the aggregated first payor user/first payee business invoice related financial transaction data, and/or the aggregated total first payor user/first payee business invoice related financial transaction amount, as a line item in a payment due item listing generated through the personal financial management and bill payment system.

In accordance with one embodiment, processing the aggregated total first payor user/first payee business invoice related financial transaction amount data as a single first payor user payment due item using the personal financial management and bill payment system at PROCESS THE AGGREGATED TOTAL FIRST PAYOR USER/FIRST PAYEE BUSINESS INVOICE RELATED FINANCIAL TRANSACTION AMOUNT DATA AS A SINGLE FIRST PAYOR USER PAYMENT DUE ITEM USING THE PERSONAL FINANCIAL MANAGEMENT AND BILL PAYMENT SYSTEM OPERATION 221 includes applying one or more aggregated first payor user/first payee business invoice related financial transaction data processing rules to the aggregated first payor user/first payee business invoice related financial transaction data.

In accordance with one embodiment, the aggregated first payor user/first payee business invoice related financial transaction data processing rules of PROCESS THE AGGREGATED TOTAL FIRST PAYOR USER/FIRST PAYEE BUSINESS INVOICE RELATED FINANCIAL TRANSACTION AMOUNT DATA AS A SINGLE FIRST PAYOR USER PAYMENT DUE ITEM USING THE PERSONAL FINANCIAL MANAGEMENT AND BILL PAYMENT SYSTEM OPERATION 221 include, but are not limited to, one or more aggregated first payor user/first payee business invoice related financial transaction data processing rules for processing the aggregated first payor user/first payee business invoice related financial transaction data, and/or the aggregated total first payor user/first payee business invoice related financial transaction amount, as a revolving payment, or payment plan, payment due item account.

Using this aggregated first payor user/first payee business invoice related financial transaction data processing rule, groups of discrete invoices can be paid by the payor user on a revolving basis similar to payments made on a credit card account, or merchant credit account.

In accordance with one embodiment, the aggregated first payor user/first payee business invoice related financial transaction data processing rules of PROCESS THE AGGREGATED TOTAL FIRST PAYOR USER/FIRST PAYEE BUSINESS INVOICE RELATED FINANCIAL TRANSACTION AMOUNT DATA AS A SINGLE FIRST PAYOR USER PAYMENT DUE ITEM USING THE PERSONAL FINANCIAL MANAGEMENT AND BILL PAYMENT SYSTEM OPERATION 221 include, but are not limited to, an aggregated first payor user/first payee business invoice related financial transaction data processing rule limiting the aggregated total first payor user/first payee business invoice related financial transaction amount to a threshold amount.

Using this aggregated first payor user/first payee business invoice related financial transaction data processing rule, the total liability of a payor user is limited to threshold total aggregated invoice amount, thereby capping the financial risk to a payee business of a payor user not paying.

In accordance with one embodiment, the aggregated first payor user/first payee business invoice related financial transaction data processing rules of PROCESS THE AGGREGATED TOTAL FIRST PAYOR USER/FIRST PAYEE BUSINESS INVOICE RELATED FINANCIAL TRANSACTION AMOUNT DATA AS A SINGLE FIRST PAYOR USER PAYMENT DUE ITEM USING THE PERSONAL FINANCIAL MANAGEMENT AND BILL PAYMENT SYSTEM OPERATION 221 include, but are not limited to, an aggregated first payor user/first payee business invoice related financial transaction data processing rule limiting the total number of unpaid discrete invoices represented in the aggregated first payor user/first payee business invoice related financial transaction data to a threshold number of discrete invoices.

Using this aggregated first payor user/first payee business invoice related financial transaction data processing rule, the total liability of a payor user is limited to a total aggregated invoice amount associated with a threshold number of discrete invoices, thereby capping the financial risk to a payee business of a payor user not paying.

In accordance with one embodiment, the aggregated first payor user/first payee business invoice related financial transaction data processing rules of PROCESS THE AGGREGATED TOTAL FIRST PAYOR USER/FIRST PAYEE BUSINESS INVOICE RELATED FINANCIAL TRANSACTION AMOUNT DATA AS A SINGLE FIRST PAYOR USER PAYMENT DUE ITEM USING THE PER- SONAL FINANCIAL MANAGEMENT AND BILL PAYMENT SYSTEM OPERATION 221 include, but are not limited to, an aggregated first payor user/first payee business invoice related financial transaction data processing rule establishing a maximum age of any of the discrete invoices represented in the aggregated first payor user/first payee business invoice related financial transaction data.

Using this aggregated first payor user/first payee business invoice related financial transaction data processing rule, the payor user is prevented from not paying a given invoice in a timely manner and is therefore encouraged to pay the total aggregated invoice amount so that the financial risk to a payee business is reduced.

In accordance with one embodiment, the aggregated first payor user/first payee business invoice related financial transaction data processing rules of PROCESS THE AGGREGATED TOTAL FIRST PAYOR USER/FIRST PAYEE BUSINESS INVOICE RELATED FINANCIAL TRANSACTION AMOUNT DATA AS A SINGLE FIRST PAYOR USER PAYMENT DUE ITEM USING THE PERSONAL FINANCIAL MANAGEMENT AND BILL PAYMENT SYSTEM OPERATION 221 include, but are not limited to, an aggregated first payor user/first payee business invoice related financial transaction data processing rule establishing a maximum average age for the discrete invoices represented in the aggregated first payor user/first payee business invoice related financial transaction data.

Using this aggregated first payor user/first payee business invoice related financial transaction data processing rule, the payor user is prevented from not paying multiple invoices in a timely manner and is therefore encouraged to pay the total aggregated invoice amount so that the financial risk to a payee business is reduced.

In accordance with one embodiment, the aggregated first payor user/first payee business invoice related financial transaction data processing rules of PROCESS THE AGGREGATED TOTAL FIRST PAYOR USER/FIRST PAYEE BUSINESS INVOICE RELATED FINANCIAL TRANSACTION AMOUNT DATA AS A SINGLE FIRST PAYOR USER PAYMENT DUE ITEM USING THE PERSONAL FINANCIAL MANAGEMENT AND BILL PAYMENT SYSTEM OPERATION 221 include, but are not limited to, an aggregated first payor user/first payee business invoice related financial transaction data processing rule establishing a threshold past due age of any of the discrete invoices represented in the aggregated first payor user/first payee business invoice related financial transaction data.

In this embodiment, the payor user is prevented from not paying multiple invoices in a timely manner and is therefore encouraged to pay the total aggregated invoice amount so that the financial risk to a payee business is reduced.

In accordance with one embodiment, the aggregated first payor user/first payee business invoice related financial transaction data processing rules of PROCESS THE AGGREGATED TOTAL FIRST PAYOR USER/FIRST PAYEE BUSINESS INVOICE RELATED FINANCIAL TRANSACTION AMOUNT DATA AS A SINGLE FIRST PAYOR USER PAYMENT DUE ITEM USING THE PERSONAL FINANCIAL MANAGEMENT AND BILL PAYMENT SYSTEM OPERATION 221 include any aggregated first payor user/first payee business invoice related financial transaction data processing rules desired, and/or as discussed herein, known in the art at the time of filing, and/or as developed/made available after the time of filing.

In one embodiment, once the aggregated first payor user/first payee business invoice related financial transaction data, and/or the aggregated total first payor user/first payee business invoice related financial transaction amount, is processed as a single first payor user payment due item using the personal financial management and bill payment system at PROCESS THE AGGREGATED TOTAL FIRST PAYOR USER/FIRST PAYEE BUSINESS INVOICE RELATED FINANCIAL TRANSACTION AMOUNT DATA AS A SINGLE FIRST PAYOR USER PAYMENT DUE ITEM USING THE PERSONAL FINANCIAL MANAGEMENT AND BILL PAYMENT SYSTEM OPERATION 221, process flow proceeds to EXIT OPERATION 230.

In one embodiment, at EXIT OPERATION 230, process 200 for integrating discrete invoices into a personal financial management and bill payment system and then aggregating discrete invoices having the same payor user and the same payee business into a single payment due item for processing is exited to await new data.

The disclosed embodiments of process 200 for integrating discrete invoices into a personal financial management and bill payment system and then aggregating discrete invoices having the same payor user and the same payee business into a single payment due item for processing provide efficient, effective, and highly adaptable solution to the long standing technical problem in the bill payment, invoice processing, and financial management arts of automatically integrating invoice related financial transaction data into a personal financial management and bill payment system and/or identifying, or distinguishing, invoice related financial transaction data, and then aggregating invoices represented in the invoice related financial transaction data having the same payor user and the same payee business into single payment due item.

However, the disclosed process 200 for integrating discrete invoices into a personal financial management and bill payment system and then aggregating discrete invoices having the same payor user and the same payee business into a single payment due item for processing does not encompass, embody, or preclude other forms of innovation in the area of automated financial transaction bill payment processing and invoicing. In addition, the disclosed process 200 for integrating discrete invoices into a personal financial management and bill payment system and then aggregating discrete invoices having the same payor user and the same payee business into a single payment due item for processing is not related to any fundamental economic practice, fundamental data processing practice, mental steps, or pen and paper based solution. In fact, the disclosed embodiments are directed to providing solutions to the relatively new problems associated with the automatic processing and display of electronic financial transaction data obtained from multiple sources, making electronic bill payments, and the management and processing of large amounts of data, i.e., "big data." Consequently, the disclosed process 200 for integrating discrete invoices into a personal financial management and bill payment system and then aggregating discrete invoices having the same payor user and the same payee business into a single payment due item for processing is not directed to, does not encompass, and is not merely, an abstract idea or concept.

In addition, the disclosed process 200 for integrating discrete invoices into a personal financial management and bill payment system and then aggregating discrete invoices having the same payor user and the same payee business into a single payment due item for processing provides for significant improvements to the technical fields of electronic transaction data processing, invoicing, financial transaction categorization, information dissemination, data processing, data management, data filtering and mining, automatic electronic bill payment, and user experience.

In addition, by allowing for the integration of invoices and invoice data into a personal financial management and bill payment system, the disclosed process 200 for integrating discrete invoices into a personal financial management and bill payment system and then aggregating discrete invoices having the same payor user and the same payee business into a single payment due item for processing helps users of the personal financial management and bill payment system identify and pay their invoices. This, in turn, helps avoid the reissuance and repeated transmission of payment due reminders and for the entry, processing, and dissemination, of redundant invoice data; thereby eliminating unnecessary data analysis before resources are allocated to processing, and/or correcting, redundant reminder data and the redundant reminder data is further transmitted/distributed.

Consequently, using the disclosed process 200 for integrating discrete invoices into a personal financial management and bill payment system and then aggregating discrete invoices having the same payor user and the same payee business into a single payment due item for processing results in more efficient use of human and non-human resources, fewer processor cycles being utilized, reduced memory utilization, and less communications bandwidth being utilized to relay data to, and from, backend systems and client systems. As a result, computing systems are transformed into faster, more efficient, and more effective computing systems by implementing process 200 for integrating discrete invoices into a personal financial management and bill payment system and then aggregating discrete invoices having the same payor user and the same payee business into a single payment due item for processing.

In addition, the disclosed process 200 for integrating discrete invoices into a personal financial management and bill payment system and then aggregating discrete invoices having the same payor user and the same payee business into a single payment due item for processing provides for the entry, processing, and dissemination, of only relevant portions of data; thereby eliminating unnecessary data analysis and correction before resources are allocated to processing, and/or correcting, faulty/irrelevant data, and/or the faulty/irrelevant data is further transmitted/distributed.

In addition, by aggregating invoices represented in the invoice related financial transaction data having the same payor user and the same payee business into single payment due item, the disclosed process 200 for integrating discrete invoices into a personal financial management and bill payment system and then aggregating discrete invoices having the same payor user and the same payee business into a single payment due item for processing provides for the processing and dissemination of invoice related financial transaction data representing multiple discrete invoices as a single payment due entity/object. This, in turn, helps avoid the processing and transmission of multiple individual invoice payment related data sets.

Consequently, using the disclosed process 200 for integrating discrete invoices into a personal financial management and bill payment system and then aggregating discrete invoices having the same payor user and the same payee business into a single payment due item for processing results in more efficient use of human and non-human resources, fewer processor cycles being utilized, reduced memory utilization, and less communications bandwidth being utilized to relay data to, and from, backend systems and client systems. As a result, computing systems are transformed into faster, more efficient, and more effective computing systems by implementing the method and system for integrating discrete invoices into a personal financial management and bill payment system and then aggregating discrete invoices having the same payor user and the same payee business into a single payment due item for processing.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein, are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the mechanism and/or process used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "integrating," "generating," "monitoring," "determining," "defining," "designating," "obtaining," "accessing," "analyzing," "obtaining," "identifying," "designating," "categorizing," "receiving," "transmitting," "implementing," "associating," "aggregating," "initiating," "collecting," "creating," "transferring," "storing," "searching," "comparing," "providing," "transforming," "incorporating." "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method for integrating discrete invoices into a personal financial management and bill payment system and then aggregating discrete invoices having the same payor user and the same payee business into a single payment due item for processing, the method comprising:

obtaining access to invoice related financial transaction data generated by the one or more payee businesses, the invoice related financial transaction data representing two or more discrete invoices submitted by one or more payee businesses requesting payment by one or more payor users of the personal financial management and bill payment system, the invoice related financial transaction data including:

payee business identity data associated with each discrete invoice represented in the invoice related financial transaction data, the payee business identity data representing the identity of the payee business associated with each discrete invoice represented in the invoice related financial transaction data, payor user identity data associated with each discrete invoice represented in the invoice related financial transaction data, the payor user identity data representing the identity of the payor user associated with each discrete invoice represented in the invoice related financial transaction data; and invoice amount data associated with each discrete invoice represented in the invoice related financial transaction data, the invoice amount data representing the payment amount associated with each discrete invoice represented in the invoice related financial transaction data;

integrating the invoice related financial transaction data into personal financial management and bill payment system payment due data of the personal financial management and bill payment system, the personal financial management and bill payment system payment due data representing one or more bills associated with a user of the personal financial management and bill payment system to be paid through the personal financial management and bill payment system;

obtaining access to the personal financial management and bill payment system;

obtaining access to the personal financial management and bill payment system payment due data, including the integrated invoice related financial transaction data;

analyzing the personal financial management and bill payment system payment due data, including the integrated invoice related financial transaction data, to identify first payor user personal financial management and bill payment system payment due data of the user;

analyzing the first payor user personal financial management and bill payment system payment due data to identify first payor user invoice related financial transaction data, the first payor user invoice related financial transaction data representing two or more discrete invoices submitted by one or more payee businesses requesting payment from the first payor user;

analyzing the first payor user invoice related financial transaction data to identify the payee business identity data associated with each discrete invoice represented in the first payor user invoice related financial transaction data;

identifying a first payee business represented in the payee business identity data associated with two or more discrete invoices represented in the first payor user invoice related financial transaction data;

aggregating all the first payor user invoice related financial transaction data representing the two or more discrete invoices that include payee business identity data identifying the first payee business to generate aggregated first payor user/first payee business invoice related financial transaction data;

analyzing the aggregated first payor user/first payee business invoice related financial transaction data to identify the invoice amount data associated with each of the two or more discrete invoices represented in the aggregated first payor user/first payee business invoice related financial transaction data;

adding the invoice amount data associated with each of the two or more discrete invoices represented in the aggregated first payor user/first payee business invoice related financial transaction data to generate aggregated total first payor user/first payee business invoice related financial transaction amount data representing a total amount owed to the first payee business by the first payor user of the personal financial management and bill payment system; and processing the aggregated total first payor user/first payee business invoice related financial transaction amount data as a single first payor user payment due item using the personal financial management and bill payment system, including applying aggregated first payor user/first payee business invoice related financial transaction data processing rules to the aggregated first payor user/first payee business invoice related financial transaction data wherein one of the rules includes a maximum age of any of the discrete invoices represented in the aggregated first payor user/first payee business invoice related financial transaction data.

2. The method for integrating discrete invoices into a personal financial management and bill payment system and then aggregating discrete invoices having the same payor user and the same payee business into a single payment due item for processing of claim 1 wherein obtaining access to invoice related financial transaction data generated by the one or more payee businesses includes:

obtaining access to personal financial management and bill payment system user financial transaction data associated with the personal financial management and bill payment system, the personal financial management and bill payment system user financial transaction data representing financial transactions associated with users of a personal financial management and bill payment system;

analyzing the personal financial management and bill payment system user financial transaction data associated with the first payor user to identify payee data included in the financial transaction data associated with the first payor user, the payee data representing one or more payees associated with first payor user financial transactions associated with the first payor user represented by a portion of the personal financial management and bill payment system user financial transaction data associated with the first payor user;

obtaining access to business invoicing system business user identification data associated with a business invoicing system, the business user identification data representing business users of the business invoicing system;

accessing the payee data and the business user identification data and analyzing the payee data and business user identification data to determine if a payee represented in the payee data matches a business user of the business invoicing system represented in the business user identification data;

identifying a payee represented in the payee data that matches a business user of the business invoicing system represented in the business user identification data, the payee being a payee associated with first financial transaction data representing a first financial transaction included in the personal financial management and bill payment system user financial transaction data associated with the first payor user;

designating the payee represented in the payee data that matches the business user of the business invoicing system as a first payee business;

transforming status data associated with the first financial transaction data representing the first financial transaction to first invoice related financial transaction data;

processing the first invoice related financial transaction data as invoice related financial transaction data; and providing the first payee business the capability to provide invoicing data representing invoices generated by first payee business to the first payor user of the personal financial management and bill payment system through the personal financial management and bill payment system.

3. The method for integrating discrete invoices into a personal financial management and bill payment system and then aggregating discrete invoices having the same payor user and the same payee business into a single payment due item for processing of claim 1 wherein obtaining access to invoice related financial transaction data generated by the one or more payee businesses includes:

obtaining access to personal financial management and bill payment system user identification data associated with users of a personal financial management and bill payment system;

obtaining access to invoicing data generated through a business invoicing system, the invoicing data representing invoices sent from payee business users of the business invoicing system to payor customers of the payee business users of the business invoicing system;

monitoring the invoicing data and identifying first invoice data representing an invoice generated by a first payee business user of the business invoicing system associated with a first payor customer of the first payee business user of the business invoicing system;

analyzing the first invoice data to identify first payor customer identification data associated with the first payor customer of the first payee business user of the business invoicing system;

analyzing the personal financial management and bill payment system user identification data and the first payor customer identification data to determine if the first payor customer associated with the first payor customer identification data is a first payor user of the personal financial management and bill payment system;

if a determination is made that the first payor customer associated with the first payor customer identification data is a first payor user of the personal financial management and bill payment system, designating the first payor customer as a first payor user of the personal financial management and bill payment system; and providing the first payee business user of the business invoicing system the capability to provide invoicing data representing invoices generated by the first payee business user of the business invoicing system to the first payor user of the personal financial management and bill payment system through the personal financial management and bill payment system.

4. The method for integrating discrete invoices into a personal financial management and bill payment system and then aggregating discrete invoices having the same payor user and the same payee business into a single payment due item for processing of claim 1 wherein obtaining access to invoice related financial transaction data generated by the one or more payee businesses includes:

obtaining access to personal financial management and bill payment system user identification data associated with users of a personal financial management and bill payment system;

obtaining access to business invoicing system payor customer identification data generated through a business invoicing system, the business invoicing system payor customer identification data being associated with payor customers of user payee businesses of a business invoicing system;

analyzing the personal financial management and bill payment system user identification data and the business invoicing system payor customer identification data to identify payor users of the personal financial management and bill payment system that are payor customers of business users of the business invoicing system;

identifying a payor user of the personal financial management and bill payment system that is a payor customer of a payee business user of the business invoicing system;

designating the payor user of the personal financial management and bill payment system first payor user of the personal financial management and bill payment system;

providing first payor user of the personal financial management and bill payment system the opportunity to integrate invoices generated by the first payee business user of the business invoicing system into the personal financial management and bill payment system; and if the first payor user of the personal financial management and bill payment system agrees to integrate invoices generated by the first payee business user of the business invoicing system into the personal financial management and bill payment system, providing the first payee business user of the business invoicing system the capability to provide invoice data representing invoices generated by the first payee business user of the business invoicing system to the first payor user of the personal financial management and bill payment system through the personal financial management and bill payment system.

5. The method for integrating discrete invoices into a personal financial management and bill payment system and then aggregating discrete invoices having the same payor user and the same payee business into a single payment due item for processing of claim 1 wherein the personal financial management and bill payment system is a financial transaction management and billing system through which a user of the financial transaction management and billing system is provided the capability to categorize financial transactions and pay the user's bills.

6. The method for integrating discrete invoices into a personal financial management and bill payment system and then aggregating discrete invoices having the same payor user and the same payee business into a single payment due item for processing of claim 1 wherein integrating the invoice related financial transaction data into personal financial management and bill payment system payment due data associated with a personal financial management and bill payment system includes assigning a personal financial management and bill payment system financial transaction category to the discrete invoices represented in the invoice related financial transaction data.

7. The method for integrating discrete invoices into a personal financial management and bill payment system and then aggregating discrete invoices having the same payor user and the same payee business into a single payment due item for processing of claim 1 wherein integrating the invoice related financial transaction data into personal financial management and bill payment system payment due data associated with a personal financial management and bill payment system includes providing the discrete invoices represented in the invoice related financial transaction data as line items in a payment due item listing generated through the personal financial management and bill payment system.

8. The method for integrating discrete invoices into a personal financial management and bill payment system and then aggregating discrete invoices having the same payor user and the same payee business into a single payment due item for processing of claim 1 wherein processing the aggregated total first payor user/first payee business invoice related financial transaction amount data as a single first payor user payment due item using the personal financial management and bill payment system includes assigning a personal financial management and bill payment system financial transaction category to the aggregated first payor user/first payee business invoice related financial transaction data.

9. The method for integrating discrete invoices into a personal financial management and bill payment system and then aggregating discrete invoices having the same payor user and the same payee business into a single payment due item for processing of claim 1 wherein processing the aggregated total first payor user/first payee business invoice related financial transaction amount data as a single first payor user payment due item using the personal financial management and bill payment system includes providing the aggregated first payor user/first payee business invoice related financial transaction data as a line item in a payment due item listing generated through the personal financial management and bill payment system.

10. The method for integrating discrete invoices into a personal financial management and bill payment system and then aggregating discrete invoices having the same payor user and the same payee business into a single payment due item for processing of claim 1 wherein aggregated first payor user/first payee business invoice related financial transaction data processing rules include one or more of:

an aggregated first payor user/first payee business invoice related financial transaction data processing rule limiting the aggregated total first payor user/first payee business invoice related financial transaction amount to a threshold amount;

an aggregated first payor user/first payee business invoice related financial transaction data processing rule limiting the total number of unpaid discrete invoices represented in the aggregated first payor user/first payee business invoice related financial transaction data to a threshold number of discrete invoices;

an aggregated first payor user/first payee business invoice related financial transaction data processing rule establishing a maximum average age for the discrete invoices represented in the aggregated first payor user/first payee business invoice related financial transaction data; and an aggregated first payor user/first payee business invoice related financial transaction data processing rule establishing a threshold past due age of any of the discrete invoices represented in the aggregated first payor user/first payee business invoice related financial transaction data.

11. A system for integrating discrete invoices into a personal financial management and bill payment system and then aggregating discrete invoices having the same payor user and the same payee business into a single payment due item for processing comprising:

an invoice related financial transaction data acquisition module for obtaining access to invoice related financial transaction data generated by the one or more payee businesses, the invoice related financial transaction data representing two or more discrete invoices submitted by one or more payee businesses requesting payment by one or more payor users of the personal financial management and bill payment system, the invoice related financial transaction data including:

payee business identity data associated with each discrete invoice represented in the invoice related financial transaction data, the payee business identity data representing the identity of the payee business associated with each discrete invoice represented in the invoice related financial transaction data, payor user identity data associated with each discrete invoice represented in the invoice related financial transaction data, the payor user identity data representing the identity of the payor user associated with each discrete invoice represented in the invoice related financial transaction data; and invoice amount data associated with each discrete invoice represented in the invoice related financial transaction data, the invoice amount data representing the payment amount associated with each discrete invoice represented in the invoice related financial transaction data;

an integration module for integrating the invoice related financial transaction data into personal financial management and bill payment system payment due data associated with a personal financial management and bill payment system, the personal financial management and bill payment system payment due data representing one or more bills associated with one or more users of the personal financial management and bill payment system to be paid through the personal financial management and bill payment system;

a personal financial management and bill payment system module for obtaining access to the personal financial management and bill payment system and personal financial management and bill payment system payment due data, including the integrated invoice related financial transaction data;

a first payor user invoice related financial transaction data identification module for analyzing the personal financial management and bill payment system payment due data, including the integrated invoice related financial transaction data, to identify first payor user personal financial management and bill payment system payment due data associated with a first payor user of the personal financial management and bill payment system and analyzing the first payor user personal financial management and bill payment system payment due data to identify first payor user invoice related financial transaction data, the first payor user invoice related financial transaction data representing two or more discrete invoices submitted by one or more payee businesses requesting payment from the first payor user;

a payee business identity data identification module for analyzing the first payor user invoice related financial transaction data to identify the payee business identity data associated with each discrete invoice represented in the first payor user invoice related financial transaction data;

first payee business represented in the payee business identity data associated with two or more discrete invoices represented in the first payor user invoice related financial transaction data;

an aggregation module for aggregating all the first payor user invoice related financial transaction data representing the two or more discrete invoices that include payee business identity data identifying the first payee business to generate aggregated first payor user/first payee business invoice related financial transaction data;

an invoice amount data identification module for analyzing the aggregated first payor user/first payee business invoice related financial transaction data to identify the invoice amount data associated with each of the two or more discrete invoices represented in the aggregated first payor user/first payee business invoice related financial transaction data;

a total first payor user/first payee business invoice related financial transaction amount calculation module for adding the invoice amount data associated with each of the two or more discrete invoices represented in the aggregated first payor user/first payee business invoice related financial transaction data to generate aggregated total first payor user/first payee business invoice related financial transaction amount data representing a total amount owed to the first payee business by the first payor user of the personal financial management and bill payment system; and an aggregated first payor user/first payee business invoice related financial transaction data processing module for processing the aggregated total first payor user/first payee business invoice related financial transaction amount data as a single first payor user payment due item using the personal financial management and bill payment system wherein processing the aggregated total first payor user/first payee business invoice related financial transaction amount data as a single first payor user payment due item using the personal financial management and bill payment system includes applying aggregated first payor user/first payee business invoice related financial transaction data processing rules to the aggregated first payor user/first payee business invoice related financial transaction data wherein aggregated first payor user/first payee business invoice related financial transaction data processing rules include an aggregated first payor user/first payee business invoice related financial transaction data processing rule establishing a maximum age of any of the discrete invoices represented in the aggregated first payor user/first payee business invoice related financial transaction data.

12. The system for integrating discrete invoices into a personal financial management and bill payment system and then aggregating discrete invoices having the same payor user and the same payee business into a single payment due item for processing of claim 11, wherein obtaining access to invoice related financial transaction data generated by the one or more payee businesses includes:

obtaining access to personal financial management and bill payment system user financial transaction data associated with the personal financial management and bill payment system, the personal financial management and bill payment system user financial transaction data representing financial transactions associated with users of a personal financial management and bill payment system;

analyzing the personal financial management and bill payment system user financial transaction data associated with the first payor user to identify payee data included in the financial transaction data associated with the first payor user, the payee data representing one or more payees associated with first payor user financial transactions associated with the first payor user represented by a portion of the personal financial management and bill payment system user financial transaction data associated with the first payor user;

obtaining access to business invoicing system business user identification data associated with a business invoicing system, the business user identification data representing business users of the business invoicing system;

accessing the payee data and the business user identification data and analyzing the payee data and business user identification data to determine if a payee represented in the payee data matches a business user of the business invoicing system represented in the business user identification data;

identifying a payee represented in the payee data that matches a business user of the business invoicing system represented in the business user identification data, the payee being a payee associated with first financial transaction data representing a first financial transaction included in the personal financial management and bill payment system user financial transaction data associated with the first payor user;

designating the payee represented in the payee data that matches the business user of the business invoicing system as a first payee business;

transforming status data associated with the first financial transaction data representing the first financial transaction to first invoice related financial transaction data;

processing the first invoice related financial transaction data as invoice related financial transaction data; and providing the first payee business the capability to provide invoicing data representing invoices generated by first payee business to the first payor user of the personal financial management and bill payment system through the personal financial management and bill payment system.

13. The system for integrating discrete invoices into a personal financial management and bill payment system and then aggregating discrete invoices having the same payor user and the same payee business into a single payment due item for processing of claim 11, wherein obtaining access to invoice related financial transaction data generated by the one or more payee businesses includes:

obtaining access to personal financial management and bill payment system user identification data associated with users of a personal financial management and bill payment system;

obtaining access to invoicing data generated through a business invoicing system, the invoicing data representing invoices sent from payee business users of the business invoicing system to payor customers of the payee business users of the business invoicing system;

monitoring the invoicing data and identifying first invoice data representing an invoice generated by a first payee business user of the business invoicing system associated with a first payor customer of the first payee business user of the business invoicing system;

analyzing the first invoice data to identify first payor customer identification data associated with the first payor customer of the first payee business user of the business invoicing system;

analyzing the personal financial management and bill payment system user identification data and the first payor customer identification data to determine if the first payor customer associated with the first payor customer identification data is a first payor user of the personal financial management and bill payment system;

if a determination is made that the first payor customer associated with the first payor customer identification data is a first payor user of the personal financial management and bill payment system, designating the first payor customer as a first payor user of the personal financial management and bill payment system; and providing the first payee business user of the business invoicing system the capability to provide invoicing data representing invoices generated by the first payee business user of the business invoicing system to the first payor user of the personal financial management and bill payment system through the personal financial management and bill payment system.

14. The system for integrating discrete invoices into a personal financial management and bill payment system and then aggregating discrete invoices having the same payor user and the same payee business into a single payment due item for processing of claim 11, wherein obtaining access to invoice related financial transaction data generated by the one or more payee businesses includes:

obtaining access to personal financial management and bill payment system user identification data associated with users of a personal financial management and bill payment system;

obtaining access to business invoicing system payor customer identification data generated through a business invoicing system, the business invoicing system payor customer identification data being associated with payor customers of user payee businesses of a business invoicing system;

analyzing the personal financial management and bill payment system user identification data and the business invoicing system payor customer identification data to identify payor users of the personal financial management and bill payment system that are payor customers of business users of the business invoicing system;

identifying a payor user of the personal financial management and bill payment system that is a payor customer of a payee business user of the business invoicing system;

designating the payor user of the personal financial management and bill payment system first payor user of the personal financial management and bill payment system;

providing first payor user of the personal financial management and bill payment system the opportunity to integrate invoices generated by the first payee business user of the business invoicing system into the personal financial management and bill payment system; and if the first payor user of the personal financial management and bill payment system agrees to integrate invoices generated by the first payee business user of the business invoicing system into the personal financial management and bill payment system, providing the first payee business user of the business invoicing system the capability to provide invoice data representing invoices generated by the first payee business user of the business invoicing system to the first payor user of the personal financial management and bill payment system through the personal financial management and bill payment system.

15. The system for integrating discrete invoices into a personal financial management and bill payment system and then aggregating discrete invoices having the same payor user and the same payee business into a single payment due item for processing of claim 11 wherein the personal financial management and bill payment system is a financial transaction management and billing system through which a user of the financial transaction management and billing system is provided the capability to categorize financial transactions and pay the user's bills.

16. The system for integrating discrete invoices into a personal financial management and bill payment system and then aggregating discrete invoices having the same payor user and the same payee business into a single payment due item for processing of claim 11 wherein integrating the invoice related financial transaction data into personal financial management and bill payment system payment due data associated with a personal financial management and bill payment system includes assigning a personal financial management and bill payment system financial transaction category to the discrete invoices represented in the invoice related financial transaction data.

17. The system for integrating discrete invoices into a personal financial management and bill payment system and then aggregating discrete invoices having the same payor user and the same payee business into a single payment due item for processing of claim 11 wherein integrating the invoice related financial transaction data into personal financial management and bill payment system payment due data associated with a personal financial management and bill payment system includes providing the discrete invoices represented in the invoice related financial transaction data as line items in a payment due item listing generated through the personal financial management and bill payment system.

18. The system for integrating discrete invoices into a personal financial management and bill payment system and then aggregating discrete invoices having the same payor user and the same payee business into a single payment due item for processing of claim 11 wherein processing the aggregated total first payor user/first payee business invoice related financial transaction amount data as a single first payor user payment due item using the personal financial management and bill payment system includes assigning a personal financial management and bill payment system financial transaction category to the aggregated first payor user/first payee business invoice related financial transaction data.

19. The system for integrating discrete invoices into a personal financial management and bill payment system and then aggregating discrete invoices having the same payor user and the same payee business into a single payment due item for processing of claim 11 wherein processing the aggregated total first payor user/first payee business invoice related financial transaction amount data as a single first payor user payment due item using the personal financial management and bill payment system includes providing the aggregated first payor user/first payee business invoice related financial transaction data as a line item in a payment due item listing generated through the personal financial management and bill payment system.

20. The system for integrating discrete invoices into a personal financial management and bill payment system and then aggregating discrete invoices having the same payor user and the same payee business into a single payment due item for processing of claim 11 wherein aggregated first payor user/first payee business invoice related financial transaction data processing rules include one or more of:
- an aggregated first payor user/first payee business invoice related financial transaction data processing rule limiting the aggregated total first payor user/first payee business invoice related financial transaction amount to a threshold amount;
- an aggregated first payor user/first payee business invoice related financial transaction data processing rule limiting the total number of unpaid discrete invoices represented in the aggregated first payor user/first payee business invoice related financial transaction data to a threshold number of discrete invoices;
- an aggregated first payor user/first payee business invoice related financial transaction data processing rule establishing a maximum average age for the discrete invoices represented in the aggregated first payor user/first payee business invoice related financial transaction data; and
- an aggregated first payor user/first payee business invoice related financial transaction data processing rule establishing a threshold past due age of any of the discrete invoices represented in the aggregated first payor user/first payee business invoice related financial transaction data.

21. A computer program product for integrating discrete invoices into a personal financial management and bill payment system and then aggregating discrete invoices having the same payor user and the same payee business into a single payment due item for processing, the computer program product including machine readable instructions for implementing a process for integrating discrete invoices into a personal financial management and bill payment system and then aggregating discrete invoices having the same payor user and the same payee business into a single payment due item for processing, the process for integrating discrete invoices into a personal financial management and bill payment system and then aggregating discrete invoices having the same payor user and the same payee business into a single payment due item for processing comprising:
- obtaining access to invoice related financial transaction data generated by the one or more payee businesses, the invoice related financial transaction data representing two or more discrete invoices submitted by one or more payee businesses requesting payment by one or more payor users of the personal financial management and bill payment system, the invoice related financial transaction data including:
- payee business identity data associated with each discrete invoice represented in the invoice related financial transaction data, the payee business identity data representing the identity of the payee business associated with each discrete invoice represented in the invoice related financial transaction data,
- payor user identity data associated with each discrete invoice represented in the invoice related financial transaction data, the payor user identity data representing the identity of the payor user associated with each discrete invoice represented in the invoice related financial transaction data; and invoice amount data associated with each discrete invoice represented in the invoice related financial transaction data, the invoice amount data representing the payment amount associated with each discrete invoice represented in the invoice related financial transaction data;

integrating the invoice related financial transaction data into personal financial management and bill payment system payment due data associated with a personal financial management and bill payment system, the personal financial management and bill payment system payment due data representing one or more bills associated with one or more users of the personal financial management and bill payment system to be paid through the personal financial management and bill payment system;

obtaining access to the personal financial management and bill payment system;

obtaining access to the personal financial management and bill payment system payment due data, including the integrated invoice related financial transaction data;

analyzing the personal financial management and bill payment system payment due data, including the integrated invoice related financial transaction data, to identify first payor user personal financial management and bill payment system payment due data associated with a first payor user of the personal financial management and bill payment system;

analyzing the first payor user personal financial management and bill payment system payment due data to identify first payor user invoice related financial transaction data, the first payor user invoice related financial transaction data representing two or more discrete invoices submitted by one or more payee businesses requesting payment from the first payor user;

analyzing the first payor user invoice related financial transaction data to identify the payee business identity data associated with each discrete invoice represented in the first payor user invoice related financial transaction data;

identifying a first payee business represented in the payee business identity data associated with two or more discrete invoices represented in the first payor user invoice related financial transaction data;

aggregating all the first payor user invoice related financial transaction data representing the two or more discrete invoices that include payee business identity data identifying the first payee business to generate aggregated first payor user/first payee business invoice related financial transaction data;

analyzing the aggregated first payor user/first payee business invoice related financial transaction data to identify the invoice amount data associated with each of the two or more discrete invoices represented in the aggregated first payor user/first payee business invoice related financial transaction data;

adding the invoice amount data associated with each of the two or more discrete invoices represented in the aggregated first payor user/first payee business invoice related financial transaction data to generate aggregated total first payor user/first payee business invoice related financial transaction amount data representing a total amount owed to the first payee business by the first payor user of the personal financial management and bill payment system; and processing the aggregated total first payor user/first payee business invoice related financial transaction amount data as a single first payor user payment due item using the personal financial management and bill payment system, including applying aggregated first payor user/first payee business invoice related financial transaction data processing rules to the aggregated first payor user/first payee business invoice related financial transaction data wherein one of the rules includes a maximum age of any of the discrete invoices represented in the aggregated first payor user/first payee business invoice related financial transaction data.

22. The computer program product for integrating discrete invoices into a personal financial management and bill payment system and then aggregating discrete invoices having the same payor user and the same payee business into a single payment due item for processing of claim 21 wherein obtaining access to invoice related financial transaction data generated by the one or more payee businesses includes:

obtaining access to personal financial management and bill payment system user financial transaction data associated with the personal financial management and bill payment system, the personal financial management and bill payment system user financial transaction data representing financial transactions associated with users of a personal financial management and bill payment system;

analyzing the personal financial management and bill payment system user financial transaction data associated with the first payor user to identify payee data included in the financial transaction data associated with the first payor user, the payee data representing one or more payees associated with first payor user financial transactions associated with the first payor user represented by a portion of the personal financial management and bill payment system user financial transaction data associated with the first payor user;

obtaining access to business invoicing system business user identification data associated with a business invoicing system, the business user identification data representing business users of the business invoicing system;

accessing the payee data and the business user identification data and analyzing the payee data and business user identification data to determine if a payee represented in the payee data matches a business user of the business invoicing system represented in the business user identification data;

identifying a payee represented in the payee data that matches a business user of the business invoicing system represented in the business user identification data, the payee being a payee associated with first financial transaction data representing a first financial transaction included in the personal financial management and bill payment system user financial transaction data associated with the first payor user;

designating the payee represented in the payee data that matches the business user of the business invoicing system as a first payee business;

transforming status data associated with the first financial transaction data representing the first financial transaction to first invoice related financial transaction data;

processing the first invoice related financial transaction data as invoice related financial transaction data; and providing the first payee business the capability to provide invoicing data representing invoices generated by first payee business to the first payor user of the personal financial management and bill payment system through the personal financial management and bill payment system.

23. The computer program product for integrating discrete invoices into a personal financial management and bill payment system and then aggregating discrete invoices having the same payor user and the same payee business into a single payment due item for processing of claim 21 wherein obtaining access to invoice related financial transaction data generated by the one or more payee businesses includes:

obtaining access to personal financial management and bill payment system user identification data associated with users of a personal financial management and bill payment system;

obtaining access to invoicing data generated through a business invoicing system, the invoicing data representing invoices sent from payee business users of the business invoicing system to payor customers of the payee business users of the business invoicing system;

monitoring the invoicing data and identifying first invoice data representing an invoice generated by a first payee business user of the business invoicing system associated with a first payor customer of the first payee business user of the business invoicing system;

analyzing the first invoice data to identify first payor customer identification data associated with the first payor customer of the first payee business user of the business invoicing system;

analyzing the personal financial management and bill payment system user identification data and the first payor customer identification data to determine if the first payor customer associated with the first payor customer identification data is a first payor user of the personal financial management and bill payment system;

if a determination is made that the first payor customer associated with the first payor customer identification data is a first payor user of the personal financial management and bill payment system, designating the first payor customer as a first payor user of the personal financial management and bill payment system; and providing the first payee business user of the business invoicing system the capability to provide invoicing data representing invoices generated by the first payee business user of the business invoicing system to the first payor user of the personal financial management and bill payment system through the personal financial management and bill payment system.

24. The computer program product for integrating discrete invoices into a personal financial management and bill payment system and then aggregating discrete invoices having the same payor user and the same payee business into a single payment due item for processing of claim 21 wherein obtaining access to invoice related financial transaction data generated by the one or more payee businesses includes:

obtaining access to personal financial management and bill payment system user identification data associated with users of a personal financial management and bill payment system;

obtaining access to business invoicing system payor customer identification data generated through a business invoicing system, the business invoicing system payor customer identification data being associated with payor customers of user payee businesses of a business invoicing system;

analyzing the personal financial management and bill payment system user identification data and the business invoicing system payor customer identification data to identify payor users of the personal financial management and bill payment system that are payor customers of business users of the business invoicing system;

identifying a payor user of the personal financial management and bill payment system that is a payor customer of a payee business user of the business invoicing system;

designating the payor user of the personal financial management and bill payment system first payor user of the personal financial management and bill payment system;

providing first payor user of the personal financial management and bill payment system the opportunity to integrate invoices generated by the first payee business user of the business invoicing system into the personal financial management and bill payment system; and if the first payor user of the personal financial management and bill payment system agrees to integrate invoices generated by the first payee business user of the business invoicing system into the personal financial management and bill payment system, providing the first payee business user of the business invoicing system the capability to provide invoice data representing invoices generated by the first payee business user of the business invoicing system to the first payor user of the personal financial management and bill payment system through the personal financial management and bill payment system.

25. The computer program product for integrating discrete invoices into a personal financial management and bill payment system and then aggregating discrete invoices having the same payor user and the same payee business into a single payment due item for processing of claim 21 wherein the personal financial management and bill payment system is a financial transaction management and billing system through which a user of the financial transaction management and billing system is provided the capability to categorize financial transactions and pay the user's bills.

26. The computer program product for integrating discrete invoices into a personal financial management and bill payment system and then aggregating discrete invoices having the same payor user and the same payee business into a single payment due item for processing of claim 21 wherein integrating the invoice related financial transaction data into personal financial management and bill payment system payment due data associated with a personal financial management and bill payment system includes assigning a personal financial management and bill payment system financial transaction category to the discrete invoices represented in the invoice related financial transaction data.

27. The computer program product for integrating discrete invoices into a personal financial management and bill payment system and then aggregating discrete invoices having the same payor user and the same payee business into a single payment due item for processing of claim 21 wherein integrating the invoice related financial transaction data into personal financial management and bill payment system payment due data associated with a personal financial management and bill payment system includes providing the discrete invoices represented in the invoice related financial transaction data as line items in a payment due item listing generated through the personal financial management and bill payment system.

28. The computer program product for integrating discrete invoices into a personal financial management and bill payment system and then aggregating discrete invoices having the same payor user and the same payee business into a single payment due item for processing of claim 21 wherein processing the aggregated total first payor user/first payee business invoice related financial transaction amount data as a single first payor user payment due item using the personal financial management and bill payment system includes assigning a personal financial management and bill payment system financial transaction category to the aggregated first payor user/first payee business invoice related financial transaction data.

29. The computer program product for integrating discrete invoices into a personal financial management and bill payment system and then aggregating discrete invoices having the same payor user and the same payee business into a single payment due item for processing of claim 21 wherein processing the aggregated total first payor user/first payee business invoice related financial transaction amount data as a single first payor user payment due item using the personal financial management and bill payment system includes providing the aggregated first payor user/first payee business invoice related financial transaction data as a line item in a payment due item listing generated through the personal financial management and bill payment system.

30. The computer program product for integrating discrete invoices into a personal financial management and bill payment system and then aggregating discrete invoices having the same payor user and the same payee business into a single payment due item for processing of claim 21 wherein aggregated first payor user/first payee business invoice related financial transaction data processing rules include one or more of:

an aggregated first payor user/first payee business invoice related financial transaction data processing rule limiting the aggregated total first payor user/first payee business invoice related financial transaction amount to a threshold amount;

an aggregated first payor user/first payee business invoice related financial transaction data processing rule limiting the total number of unpaid discrete invoices represented in the aggregated first payor user/first payee business invoice related financial transaction data to a threshold number of discrete invoices;

an aggregated first payor user/first payee business invoice related financial transaction data processing rule establishing a maximum average age for the discrete invoices represented in the aggregated first payor user/first payee business invoice related financial transaction data; and an aggregated first payor user/first payee business invoice related financial transaction data processing rule establishing a threshold past due age of any of the discrete invoices represented in the aggregated first payor user/first payee business invoice related financial transaction data.

\* \* \* \* \*